(12) United States Patent
Tan et al.

(10) Patent No.: US 7,859,977 B2
(45) Date of Patent: Dec. 28, 2010

(54) OPTICAL PICK-UP UNIT

(75) Inventors: Kim Leong Tan, Santa Rosa, CA (US); Karen Denise Hendrix, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 657 days.

(21) Appl. No.: 11/843,082

(22) Filed: Aug. 22, 2007

(65) Prior Publication Data

US 2008/0049584 A1  Feb. 28, 2008

Related U.S. Application Data

(60) Provisional application No. 60/823,326, filed on Aug. 23, 2006.

(51) Int. Cl.
*G11B 7/00* (2006.01)

(52) U.S. Cl. .............. 369/112.17; 369/112.01; 369/112.16; 369/110.04

(58) Field of Classification Search ............ 369/110.04, 369/112.01, 112.16, 112.17
See application file for complete search history.

(56) References Cited

U.S. PATENT DOCUMENTS

| | | | |
|---|---|---|---|
| 2,403,731 A | 7/1946 | MacNeille | 88/65 |
| 4,312,570 A | 1/1982 | Southwell | 359/488 |
| 5,196,953 A | 3/1993 | Yeh et al. | 349/119 |
| 5,912,762 A | 6/1999 | Li et al. | 359/352 |
| 6,081,498 A | 6/2000 | Yoo et al. | 369/112.21 |
| 6,590,707 B1 | 7/2003 | Weber | 359/498 |
| 7,035,192 B2 | 4/2006 | Kitaoka et al. | 369/112.01 |
| 7,123,416 B1 * | 10/2006 | Erdogan et al. | 359/589 |
| 7,170,574 B2 | 1/2007 | Tan et al. | 349/117 |
| 7,203,001 B2 | 4/2007 | Deng et al. | 359/486 |
| 2002/0021649 A1 | 2/2002 | Yoo et al. | 369/112.1 |
| 2003/0227861 A1 | 12/2003 | Kim et al. | 369/112.15 |
| 2004/0032815 A1 | 2/2004 | Kim et al. | 369/112.26 |
| 2004/0120242 A1 | 6/2004 | Kim et al. | 369/112.17 |

(Continued)

FOREIGN PATENT DOCUMENTS

EP     1542044     6/2005

(Continued)

OTHER PUBLICATIONS

Kitagawa et al, "Form birefringence of SiO2/Ta2O5 periodic multilayers", Applied Optics, Vo. 24, No. 20, 1985, pp. 3359-3362.

(Continued)

*Primary Examiner*—Wayne R Young
*Assistant Examiner*—Adam R Giesy
(74) *Attorney, Agent, or Firm*—Matthew A. Pequignot; Pequignot + Myers LLC

(57) ABSTRACT

An optical pick-up including a fold mirror having an achromatic quarter-wave plate coating is provided. To allow the thin film coating to efficiently provide the quarter-wave retardation, the optical pick-up is configured such that the polarization of light incident on the fold mirror is at a predetermined angle. According to one embodiment, the predetermined angle is provided by rotating the light sources. According to another embodiment, the predetermined angle is provided by rotating a plane containing the light sources and the beam combiners. In each embodiment, the beam combiners and the fold mirror are arranged along the same axis to further improve efficiency.

22 Claims, 13 Drawing Sheets

U.S. PATENT DOCUMENTS

| | | | |
|---|---|---|---|
| 2004/0246871 A1 | 12/2004 | Kim et al. | 369/112.01 |
| 2004/0246876 A1 | 12/2004 | Kim et al. | 369/112.23 |
| 2005/0057714 A1 | 3/2005 | Jeon et al. | 349/122 |
| 2005/0128391 A1 | 6/2005 | Tan et al. | 349/117 |
| 2005/0180292 A1 | 8/2005 | Nagashima | 369/112.01 |
| 2005/0213471 A1 | 9/2005 | Taguchi et al. | 369/109.02 |
| 2006/0001969 A1 | 1/2006 | Wang et al. | 359/494 |
| 2006/0028932 A1 | 2/2006 | Nakamura et al. | 369/44.23 |
| 2006/0039265 A1 | 2/2006 | Lee | 369/112.01 |
| 2006/0083145 A1 | 4/2006 | Yoo et al. | 369/112.01 |
| 2006/0126459 A1 | 6/2006 | Moon et al. | 369/44.37 |
| 2006/0268207 A1 | 11/2006 | Tan et al. | 349/117 |
| 2006/0285208 A1 | 12/2006 | Huang | 359/559 |
| 2007/0053271 A1 | 3/2007 | Ryu et al. | 369/112.09 |
| 2007/0070276 A1 | 3/2007 | Tan et al. | 349/117 |
| 2007/0139771 A1 | 6/2007 | Wang et al. | 359/494 |
| 2007/0165308 A1 | 7/2007 | Wang et al. | 359/494 |
| 2007/0285601 A1 | 12/2007 | Hendrix et al. | 349/117 |

FOREIGN PATENT DOCUMENTS

| | | |
|---|---|---|
| EP | 1726987 | 11/2006 |
| EP | 1783520 | 5/2007 |
| JP | 2005327335 | 11/2005 |

OTHER PUBLICATIONS

Laser Focus World Web article: Kim Tan, Karen Hendrix, and Paul McKenzie, "Optical Fabrication: Thin films provide wide-angle correction for waveplate components" Mar. 2007: http://www.laserfocusworld.com/display_article/286513/12/ARTCL/none/Feat/OPT.

Karen Hendrix and K.L. Tan, M. Duelli, D.M. Shemo and M. Tilsch, "Birefringent films for contrast enhancement of LCoS projection systems," J. Vac. Sci. Technol. A 24(4), pp. 1546-1551, 2006.

L.I. Epstein, "The Design of Optical Filters" J. of the Opt. Soc. of Am., vol. 42, No. 11, Nov. 1952.

C.L. Bruzzone, et al. "High-performance LCoS optical engine using Cartesian polarizer technology," SID Symposium Digest Tech Papers, 34, pp. 126-129, 2003.

D. Hansen, E. Gardner, R. Perkins, M. Lines and A. Robbins, "The display applications and physics of the Proflux wire grid polarizer," SID 02 Digest, p. 730, 2002.

S.K. Eckhardt et al., "3M PBS for high performance LCoS optical engine," in Projection Displays IX, M.H. Wu, ed., Proc. SPIE-IS&T Electronic Imaging, 5002, pp. 106-110, 2003.

G. Sharp and J. Birge. "Retarder Stack Technology for Color Manipulation," SID Symposium, 30, p. 1072,1996.

Sony press release, http://www.sony.net/SonyInfo/News/Press_Archive/200405/04-026E, May 17, 2004.

D.W. Berreman, "Optics in stratified and anisotropic media: 4×4 matrix formulation," J. Opt. Soc. Am. 62, pp. 502-510, 1972.

P. Yeh, "Electromagnetic propagation in birefringent layered media," J. Opt. Soc. Am. 69, pp. 742-756, 1979.

* cited by examiner

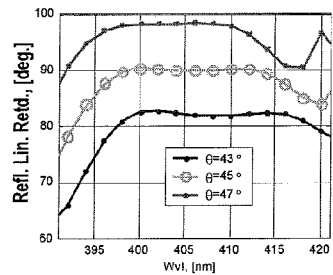 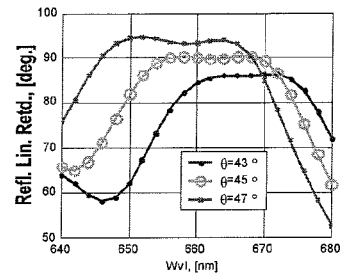 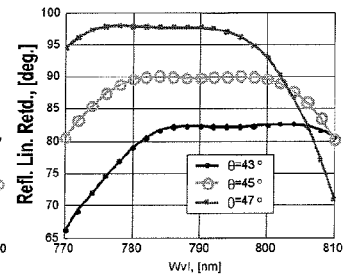
Fig. 16a(i)　　　　Fig. 16b(i)　　　　Fig. 16c(i)
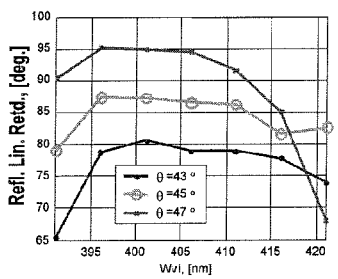 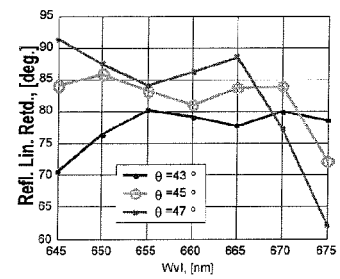 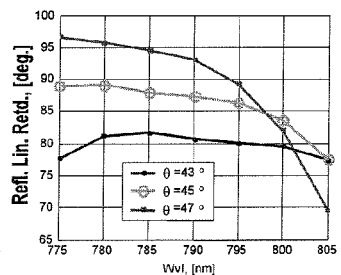
Fig. 16a(ii)　　　　Fig. 16b(ii)　　　　Fig. 16c (ii)
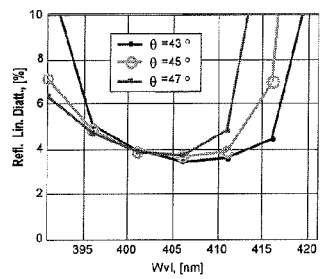 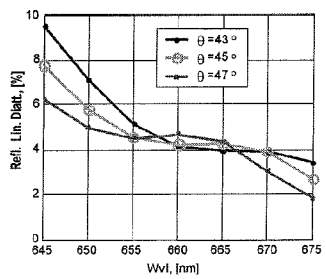 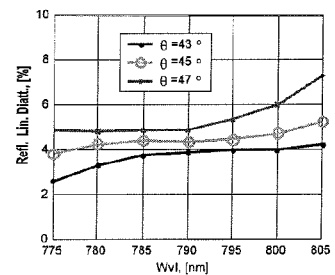
Fig. 16a(iii)　　　　Fig. 16b(iii)　　　　Fig. 16c(iii)

OPTICAL PICK-UP UNIT

CROSS-REFERENCE TO RELATED APPLICATIONS

This application claims priority from U.S. Provisional Application No. 60/823,326 filed Aug. 23, 2006, which is hereby incorporated by reference for all purposes.

MICROFICHE APPENDIX

Not Applicable.

TECHNICAL FIELD

The present application relates generally to optical pick-up units, and in particular, to optical pick-up units utilizing thin film coatings for providing a retardation component.

BACKGROUND OF THE INVENTION

The compact disc (CD) was invented in the 1980s to allow for an all-digital recording of audio signals. The optical pick-up unit (OPU) for audio-CD and/or CD-ROM uses a near-infrared (NIR) (e.g., 780 nm, 785 nm, 790 nm) semiconductor laser to read-out the encoded digital information. The numerical aperture (NA) of the objective lens is about 0.45, allowing a pit (one unit of encoding on disc) measuring about 100 nm deep, 500 nm wide and 850 nm to 3500 nm long depending on the radial distance from the disc center.

The first commercial digital versatile disc (DVD) appeared in the 1990s, with crucial optical design changes to allow for a physical recording density increase of about 3.5 times CDs. The gain in physical density was made possible by employing a shorter wavelength semiconductor (SC) laser (e.g., 650 nm, 660 nm red band, etc. compared to 780 nm near-IR band (NIR) in audio-CD) and a larger NA lens (e.g., 0.6 NA requiring a 0.6 mm thick DVD disc). A backward compatible DVD/CD optical pick-up unit employs two laser sources, either packaged as a single component or discretely, that have their read beams coupled by polarization beam combiners (PBCs) and/or dichroic beam combiners (DBCs).

Successors to the DVD media format ranges from Blu-ray Disc (BD) to high density HD-DVD. In these systems, the read/write SC laser wavelength is further decreased to about 405~410 nm blue-violet band and the NA is increased to about 0.85. In BD or HD-DVD backward compatible DVD/CD systems, a third wavelength laser (e.g., co-packaged or discrete with respect to the first two lasers) is required to support all three disc media formats.

Referring to FIG. 1, there is shown one example of a prior art 3-wavelength HD-DVD/DVD/CD optical pick-up unit (OPU). The OPU 100 includes an array of semiconductor laser sources 110 (i.e., shown as three discrete laser diodes (LD) including a first LD 111 at $\lambda$=780 nm, a second LD 112 at $\lambda$=660 nm, and a third LD 113 at $\lambda$=405 nm), the output of which are spatially multiplexed by an array of polarization beam combiner cubes (PBC) 130, is collimated by a lens system 160 and is folded by a leaky mirror 140 before being imaged (focused) onto a single "pit" area on the rotating disc media 150 via an objective lens 161. The leaky mirror 140 allows for a small fraction (e.g., 5%) of the incident beam energy to be tapped off and focused onto a monitor photodiode (PD) 175 via another lens 165.

The output from the array of LD sources 110 is substantially linearly polarized (e.g., 'S' polarized with respect to the PBC hypotenuse surface). Prior to reaching the array of PBC cubes 130, these linearly polarized beams are transmitted through an array of low-specification polarizers 120, which protect the LD sources from unwanted feedback (e.g., "P" polarized light). Conventionally, the protection filters 120 are simple dichroic absorptive polarizers with a 10:1 polarization extinction ratio.

The main ray from each of the LD sources 110 is directed along the common path 180 towards the disc media 150. Prior to reaching the quarter-waveplate (QWP) 145, the light is substantially linearly polarized. After passing through the QWP 145, the linearly polarized (LP) light is transformed into circularly polarized (CP) light. The handedness of the CP light is dependent on the optic axis orientation of the QWP (for a given S- or P-polarized input). In the example shown, with 'S' polarization input to the QWP, if the slow-axis of the QWP is aligned at 45° counter clockwise (CCW), with respect to the p-plane of the PBC, a left-handed circularly (LHC) polarized results at the exit of the QWP (LHC, having a Jones vector $[1\ j]^T/\sqrt{2}$ and with the assumption of intuitive RH-XYZ coordinate system while looking at the beam coming to the observer).

In a pre-recorded CD and DVD disc, where there is a physical indentation of a recorded pit, the optical path length difference between a pit and its surrounding "land", at ⅙ to ¼ wave, provides at least partial destructive interference and reduces the light detected by the main photodiode 170 positioned at the second port of the PBC cube array 130. On the other hand, the absence of a pit causes the change of the CP handedness, at substantially the same light power in its return towards the PBC cube array 130. The light has effectively been transformed by the QWP in double-passing to convert the initially S-polarized light to P-polarized light on its return to the PBC array 130.

Referring to FIG. 2, there is shown another example of a prior art OPU that provides BD/HD-DVD read/write access and legacy CD/DVD backward compatibility. The OPU 200 includes a three-wavelength laser diode 210 (i.e., three SC lasers that are co-packaged with very small lateral offset between the light emitting junctions), a first cube polarization beam-splitter (PBS) 231 for separating the write-beam and the read-beam into two orthogonal paths, a second cube dichroic beam-splitter (DBS) 232 for further separating the read-beam into a first path to the BD/HD-DVD disc photodiode 271 and a second path to the CD/DVD legacy disc photodiode 272 (i.e, a long-wave pass (LWP) filter immersed in glass media, transmitting the long CD/DVD wavelengths and reflecting the short BD/HD-DVD wavelength). The write beam passes through a collimating lens system 260, a 45 degree prism 240, and an objective lens 261, before reaching the disc media 262. The remaining components include a diffraction grating and various lenses, as is well known in the art. A QWP 245 is inserted in between the collimating lens system 260 and the objective lens 261. As discussed above, the fast/slow axes of the QWP are aligned approximately ±45 degrees with respect to the system 'S' and 'P' axes so as to provide circularly polarized light upon first pass there through.

In each of the OPU systems illustrated in FIGS. 1 and 2, the QWP functions as a polarization converter by, in a first pass, transforming linearly polarized light having a first polarization state to circularly polarized light, and in a second pass, transforming circularly polarized light into linear polarized light having a second orthogonal polarization state. Conventionally, QWPs are formed from birefringent elements such as inorganic crystals (e.g., single crystal quartz, single crystal $MgF_2$, $LiNbO_3$, etc.), liquid crystals, or stretched polymer films (e.g., polycarbonate, polyvinyl alcohol, etc). Unfortunately, conventional QWPs only function efficiently within a small wavelength band.

Accordingly, OPU systems, such as those illustrated in FIGS. 1 and 2, often use an achromatic QWP (AQWP), which provides quarter-wave retardance at more than one wavelength band and/or over a relatively broad wavelength band. Conventionally, AQWPs are fabricated by laminating two or more different waveplates together (e.g., a half-waveplate layer and a quarter-waveplate layer of two different index dispersion birefringent materials, such as quartz and $MgF_2$, bonded together with an adhesive with their optical axes orthogonal to one another, or two or more layers of similar birefringent layers aligned with predetermined azimuthal angle offsets). However, while laminated AQWP structures do provide an increased bandwidth, they are also associated with poor environmental resistance. In addition, the use of two or more waveplate layers increases manufacturing costs of the AQWPs due to the required thickness and azimuthal angle offset tolerances.

With the current high density optical storage systems (i.e., one that includes a HD-DVD or BD disc reading/writing channel), the reliability of the QWP element becomes a critical factor at high power blue-violet laser output (e.g., 240 mW or higher power for faster read/write speed). Furthermore, an AQWP for all three light channels, blue-violet 405 nm, red 660 nm and NIR 780 nm is required to produce approximately, 100 nm, 165 nm and 200 nm of retardation magnitudes. These disparate retardation magnitude requirements, obtained from a high reliability birefringent component and at a low cost for consumer electronic integration, drive the search of alternate QWP technology other than single crystalline materials and stretched organic foils. One solution might involve separating the short wavelength blue-violet channel with its own OPU and the legacy red/NIR DVD/CD channels with a conventional OPU, including a stretched foil AQWP. However, this approach increases costs since there are multiple redundant optical components, fold mirrors, lenses, etc.

It is well known in the industry that an optical thin film having a series of homogeneous, isotropic dielectric layers and fabricated by high-vacuum deposition processes yields different phase changes upon reflection and transmission for a linear polarization aligned parallel to the plane of incidence (P-pol.) and perpendicular to the plane of incidence (S-pol). The fundamental reason for the phase changes in reflection and transmission at non-normal incidence is the effective index of refraction changes for P-pol. and S-pol. as a function of angles of incidence:

$$n_p = \frac{n}{\cos(\theta)} \text{ and } n_s = n\cos(\theta),$$

where $n_p$ and $n_s$ are the effective indices at $\theta$ angle of refraction from layer normal, $\theta$ is related to the angle of incidence $\theta_0$ by Snell's law, $$n_0 \sin(\theta_0) = n \sin(\theta),$$

where $n_0$ is the refractive index of incidence medium and n is the refractive index of a homogeneous thin film layer.

Given this historical knowledge, a thin film stack for transmissive or reflective operation can be designed, where retardation performance at non-normal incidence in addition to the filter power characteristics (such as short-wave pass, band-pass, anti-reflection, high reflection, etc) are achieved. One such design example is found U.S. Pat. No. 4,312,570 to Southwell, which teaches the design of a QWP (i.e., 90° retarder) at 45-deg. angle of incidence, utilizing a series of less than quarter-wave optical thickness (QWOT) layers at 10.6 μm wavelength. In this design, the stack of film is essentially transparent and the high reflectance is substantially obtained by the underlying silver substrate. In addition, this design is inherently narrow band (i.e., small fractions of useful wavelengths relative to the design center wavelength where the power and retardation properties can be achieved). Another design example is found in U.S. Pat. No. 5,196,953 to Yeh et al, which teaches form-birefringence using a series of alternative index thin layers to provide for net retardation at angles over a large bandwidth. Yet another design example is provided in U.S. patent Ser. No. 11/753,946, filed May 25, 2007, which is hereby incorporated by reference. With these homogeneous dielectric thin film coatings, one can only realize what is termed C-plate birefringent symmetry. The stack of thin film is either a positive or a negative C-plate, with is C-axis (the optic axis of an effective uniaxial indicatrix) aligned parallel to substrate normal.

If one examines the layout of a conventional OPU system, there is natural beam folding location, where the light beam traversing a series of optical components, all populating a given plane (e.g., horizontal plane), is steered through a 90 degree direction change in order to access the disc media. The folding optic is typically a 45 degree inclined high-reflector plate or a triangular prism with the inclined surface coated with a high reflector film.

The use of a thin film AQWP, in place of a standalone conventional AQWP in an OPU system is attractive for several reasons. The thin film AQWP can be made of high reliability dielectric layers; it does not involve growing and polishing birefringent crystal plates, hence it can be made at a lower cost; and it is not subjected to photo-chemical degradation of blue-violet lasers as in stretched polymer foils. For these reasons, there has been increased interest in replacing the conventional AQWP with an inclined thin-film coated plate having a phase shift property.

In US Pat. Appl. No. 2004/0246876, Kim et al. show a 2-wavelength DVD/CD OPU that uses a phase shift coating layer to create a 90 degree phase delay between P- and S-polarized light. The phase shift coating layer, which they state can be formed on any number of components, is intended to replace the conventional achromatic quarter-wave plate, thus providing a reduction in manufacturing costs. In one embodiment, the phase shift coating is formed on the fold mirror such that light is incident thereon at a 45 degree angle. In this embodiment, one skilled in the art would expect the phase shift coating to function as a C-plate. Unfortunately, the proposed OPU layout does not account for the fact that the slow and fast axes of the inclined C-plate are confined parallel and orthogonal to its tilt axis. Accordingly, the proposed OPU design, while incorporating a phase shift coating, does not convert linear polarized light input to left or right hand circularly polarized output and vice versa upon reflection off the fold mirror. Without this retardation effect, there is no change in polarization of the first pass incident light beam and the second return light beam, such that all light beams from both DVD/CD laser emitters are returned to the laser sources instead of being steered to the detector via a polarization beamsplitter.

In US Pat. Appl. No. 2006/0126459, Moon et al. show a 2-wavelength DVD/CD OPU that uses a phase shift mirror that also includes a coating corresponding to a quarter-wave plate on its surface. In contrast to the design proposed in US Pat. Appl. No. 2004/0246876, this configuration addresses the fact that the linearly polarized light must be incident on the phase shift mirror with its direction of polarization tilted at a predetermined angle (e.g., 45 degrees) and thus accounts for the fact that the slow and fast axes of the C-plate are confined to its tilt axis. Unfortunately, while this design does provide an improvement, it is lacking in that it is lossy, relatively complex, and limited to only two wavelengths. With regard to the former, most of the loss appears to originate from the use of a plate beam splitter, which separates all of the laser source optics, which are located on one side of the plate beam-splitter, from the detector, which is located on a second other side of the plate beam-splitter. The plate beam splitter is angled relative to cubic beam splitter such that both S-pol. and P-pol. light beams relative to the cubic beam splitter are incident on the plate beam-splitter as approx. half S-pol. and half P-pol. in the first pass from the laser sources to the disc media; and such that the plate beam splitter functions as a non-polarizing beam splitter (e.g., 50:50 intensity split). This intensity split, which is encountered twice, results in significant light loss.

In US Pat. Appl. No. 2006/0039265, Lee also discloses an OPU that does not use a conventional, standalone AQWP. More specifically, Lee discloses the use of multiple optical thin films, along the light path between the laser diode and the disc media, including polarization beam-splitter (PBS) cubes and fold mirror reflector plate to generate the cumulative 90 degree S-pol. vs. P-pol. phase difference. Unfortunately, the design, which generally includes at least one PBS cube, does not take the diattenuation effects of the PBS cube(s) into account. With diattenuation, which was stated to be roughly 90% (i.e., 0% S-pol. reflected and 90% P-pol. reflected), the phase change of the attenuated linear polarization direction does not matter. There is no reflected light in the attenuated direction to cause birefringent effects. Consequently, the output of the PBS cubes is strictly P-pol. or S-pol. Notably, Lee also fails to provide an azimuthal offset of the incident linear polarization with respect to the partial QWP phase coating on the fold mirror. Accordingly, the light reflected from the fold mirror will not be changed from linear to circular polarization. The return light from the disc media will be steered towards the laser sources, instead of the detector owing to the unchanged polarization.

It is an object of the instant invention to provide an OPU incorporating a coating that provides substantially quarter-wave retardance (i.e., a 90 degree phase shift) with a configuration that obviates at least some of the above-described problems of the prior art.

SUMMARY OF THE INVENTION

In accordance with one aspect of the instant invention there is provided an optical pick-up apparatus comprising a plurality of light sources including a first light source for emitting light at a first wavelength and a second light source for emitting light at a second other wavelength; at least one beam combiner for transmitting the light emitted from each light source in the plurality of light sources along a common optical path in a first direction parallel to a first axis; a reflector for redirecting the light transmitted in the first direction in a second direction, the second direction parallel to a second axis substantially perpendicular to the first axis, the reflector including a coating for providing substantially quarter-wave retardation at the first and second wavelengths at a predetermined angle of incidence; an objective lens for focusing the light redirected by the reflector onto an optical disc; and at least one photo-detector for detecting light reflected from the optical disc, wherein the at least one beam combiner and the reflector are disposed along the first axis, and wherein the light transmitted in the first direction by the at least one beam combiner includes linearly polarized light having its electric field vector substantially perpendicular to the first axis and at an oblique angle to the second axis.

For the following defined terms, these definitions shall be applied, unless a different definition is given in the claims or elsewhere in this specification.

The term "birefringent" will be understood to refer to having multiple different indices of refraction. In general, birefringence causes light having orthogonal linear polarizations (e.g., S- and P-polarized light) to propagate with different velocities through a medium. This varying velocity results in a phase difference between the two orthogonal polarizations.

The term "retardance" will be understood to refer to the phase difference between two orthogonal linear polarization components. Retardance is often expressed as a fraction of a wave (e.g., in degrees or nanometers).

The term "retardation" will be understood to refer to the difference between two orthogonal indices of refraction times the thickness of the optical element. Alternatively, the term "retardation" will be understood to refer to the signed phase difference between two orthogonal linear polarization components. Notably, even within the instant application, the term "retardation" is often used interchangeably with the term "retardance".

The term "uniaxial" will be understood to refer to having two different indices of refraction (e.g., where at least two of nx, ny and nz are substantially equal).

The term "in-plane" will be understood to describe being parallel to the plane of component, such as in-plane birefringence, in-plane retardance, etc.

The term "out-of-plane" will be understood to describe being parallel to the component normal, such as out-of-plane birefringence, out-of-plane retardance, etc.

The term "in-plane retardation" will be understood to refer to the product of the difference between two orthogonal in-plane indices of refraction times the thickness of the optical element.

The term "out-of-plane retardation" will be understood to refer to the product of the difference of the index of refraction along the thickness direction (z direction) of the optical element and one in-plane index of refraction times the thickness of the optical element. Alternatively, this term will be understood to refer to the product of the difference of the index of refraction along the thickness direction (z direction) of the optical element and the average of in-plane indices of refraction times the thickness of the optical element.

The term "A-plate" will be understood to include an optical retarder with its C-axis aligned parallel to the plane of device.

The term "C-plate" will be understood to include an optical retarder with its C-axis aligned parallel to the device normal direction (i.e., the axis of the extraordinary refractive index $n_e$ is perpendicular to the plane of the optical retarder). A C-plate is considered to be positive if the extraordinary index $n_e$ is greater than the ordinary index $n_o$, and negative if the extraordinary index $n_e$ is less than the ordinary index $n_o$. Alternatively, a C-plate is considered to be positive if the retardance increases with angle of incidence, and negative if the retardance decreases with angle of incidence.

BRIEF DESCRIPTION OF THE DRAWINGS

Further features and advantages of the present invention will become apparent from the following detailed description, taken in combination with the appended drawings, in which:

FIG. 16 shows the theoretical retardance spectra (top row, including FIGS. 16a(i), 16b(i) and 16c(i)), the measured retardance spectra (middle row including FIGS. 16a(ii), 16b(ii) and 16c(ii)), and the measured diattenuation spectra (bottom row including FIGS. 16a(iii), 16b(iii) and 16c(iii)) of an all dielectric reflective achromatic QWP, at a) the BD/HD-DVD wavelength band at 405 nm, b) the DVD wavelength band at 660 nm, and c) the CD wavelength band at 780 nm, each calculated at 43, 45 and 47 degrees incidence.

It will be noted that throughout the appended drawings, like features are identified by like reference numerals.

DETAILED DESCRIPTION OF THE INVENTION

Figure 3:
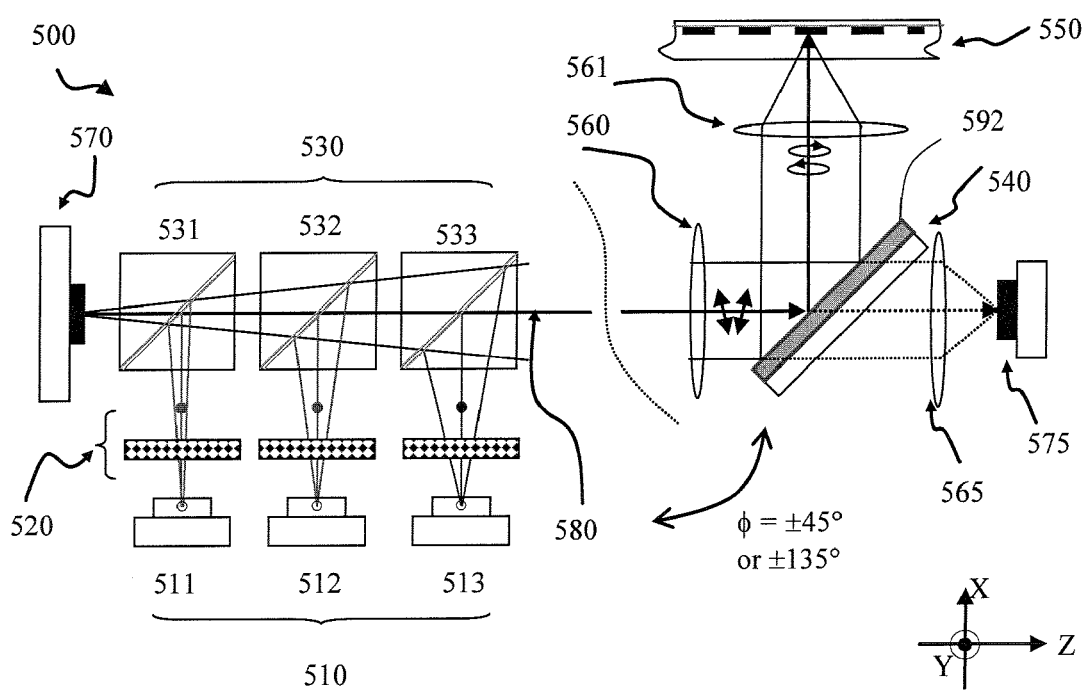
FIG. 3 shows an OPU in accordance with one embodiment of the instant invention.

Referring to FIG. 3 there is shown one embodiment of an OPU system 500 in accordance with the instant invention. The OPU system 500, which has a configuration similar to the system 100 shown in FIG. 1, includes at least one light source 510, an array of protection filters 520, an array of polarization beam combiners 530, a reflector 540, a rotating optical disc 550, a collimating lens 560, an objective lens 561, a focusing lens 565, a main photodiode 570, and a monitor photodiode 575.

The at least one light source 510, which is shown as an array of three discrete laser diodes (LDs) 511, 512, and 513, provides linearly polarized light at one or more different wavelengths (e.g., at 780 nm, 660 nm, and 405 nm, respectively). Alternatively, the at least one light source 510 includes three co-packaged LDs. Further alternatively, the at least one light source 510 includes more or less than three LDs.

Figure 4:
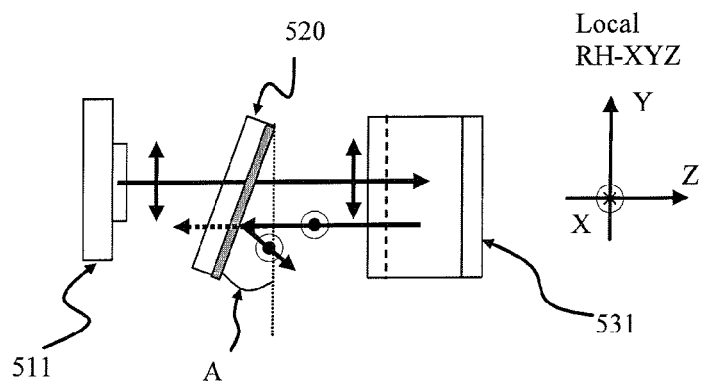
FIG. 4 illustrates a subsystem of an OPU in accordance with the instant invention, wherein the protection filters are tilted edge filters.

The array of protection filters 520 is used to block unwanted reflected light from the disc media, steered towards the at least one light source 510 (e.g., P-polarized light). Conventionally, the protection filters 520 are simple dichroic absorptive polarizers used at normal incidence. Alternatively, the protection filters 520 are slightly tilted edge filters. In either instance, the filters 520 will typically have a polarization extinction ratio of about 10:1. Notably, slightly tilted edge filters are expected to be more reliable than dye-doped dichroic absorptive polarizers, particularly in the shorter HD-DVD wavelength range. FIG. 4 illustrates the use of a tilted edge filter. In a forward propagating direction, the tilted thin film coating 520 passes the local P-polarization transmitted from a first LD 511, and transmits it to a first polarization beam combiner 531. In a backward propagating direction, the LD 511 is protected from the orthogonal polarization beam (e.g., local S-polarization) by the filter 520. The filter 520 is rotated CW or CCW by a small angle A about the X-axis, in the local RH-XYZ coordinate system. Advantageously, the use of tilted edge filters 520 with the C-plate thin film coating 592 increases the number of all-dielectric components in the optical system, thus providing a high-reliability OPU. Of course, the use of tilted edge filters is beneficial with or without the C-plate thin film coating (i.e., with a conventional achromatic quarter-wave plate).

The array of polarization beam combiners (PBCs) 530, which includes a first PBC 531, a second PBC 532, and a third PBC 533, is used to spatially multiplex the output from the array of LDs 510 and direct it along a common light path 580. In contrast to a traditional MacNeille-type PBC cube, which always reflects one polarization (e.g., S-pol.) and transmits the orthogonal polarization (e.g., P-pol.), the array of polarization beam combiners 530 are wavelength dependent. For example, in a forward propagating direction, the first PBC cube 531 couples light $\lambda_1$ from the first LD 511 to the common path 580 by reflecting S-polarized light at $\lambda_1$. In a backward propagating direction, the first PBC cube 531 transmits P-polarized light at $\lambda_1$, as well as transmitting the P-polarized light at $\lambda_2$ and $\lambda_3$, which are associated with LD 512 and 513, respectively. Similarly, PBC cube 532 couples $\lambda_2$ to the common path 580 by reflecting S-polarized light at $\lambda_2$ and transmitting P-polarized light at $\lambda_1$, $\lambda_2$ and $\lambda_3$ as well as transmitting S-polarized and at $\lambda_1$, while PBC cube 533 couples $\lambda_3$ to the common path 580 by reflecting S-polarized light at $\lambda_3$ and transmitting P-polarized light at $\lambda_1$, $\lambda_2$ and $\lambda_3$ as well as transmitting S-polarized and at $\lambda_1$ and $\lambda_2$.

The reflector 540 redirects light transmitted from the PBCs 530 through a 90-degree beam folding to the rotating optical disc 550. The reflector 540 includes a thin film coating 592 that provides substantially quarter-wave retardation for at least one wavelength channel (e.g., three wavelengths with approximately 405 nm, 660 nm and 780 nm for the OPU system shown in FIG. 3). According to one embodiment, the thin film coating 592 includes a plurality of alternating layers having contrasting refractive indices that are incorporated into a filter (e.g., short-wave pass or long-wave pass, band pass, high reflection, etc.) and deposited on a transparent substrate. The transparent substrate may be a parallel plate or a near 45° prism (e.g., the thin film coating 592 may be deposited on the angled facet of a prism). In this embodiment, the filter functions a leaky mirror and allows for a small fraction (e.g., 5%) of the incident beam energy to be tapped off and focused onto the monitor photodiodes 575. In another embodiment, the high reflector redirects substantially all incident light, S-pol. and P-pol., to the orthogonal beam path towards the optical disc 550.

The remaining optical components, including the collimating lens 560, the objective lens 561, the focusing lens 565, and the photodiodes (PD) 570, 575, are similar to those used in the prior art. Notably, the system 500 shown in FIG. 3 has been simplified to some extent for illustrative purposes. For example, in commercial OPUs the LD output is typically fanned-out to multiple spots (e.g., 3) for tracking the pit-lane, and auxiliary photodiode elements are mounted at the detector plane to determine the correct tracking. In addition, a photodiode array may be used in place of the main PD 570, to aid the objective lens focusing, in conjunction with cylindrical focusing lenses at the detector plane.

In operation, linearly polarized light from each LD 511, 512, 513 is transmitted as polarized light (e.g., S-polarized light) through the array of protection filters 520, is spatially multiplexed by the array of PBCs 530, and is directed along common optical path 580. The linearly polarized light is then collimated by collimating lens 560, and transmitted to the leaky mirror 540 having the C-plate QWP coating 592. The leaky mirror 540 transforms the linearly polarized light into circularly polarized light and redirects it to the optical disc 550 via the objective lens 561. Light reflected by the optical disc 550 is retransmitted through the objective lens 561 and is reflected from the reflector 540 towards the collimating lens 560. After double passing/reflecting from the leaky mirror 540, the circularly polarized light is transformed again to linearly polarized light having a polarization state orthogonal to the incident light (e.g., will be P-polarized light). The array of PBCs passes the P-polarized light at each of the multiple wavelengths and directs it to the main photodiode 570.

Notably, the performance of this optical system 500 is dependent on an angular offset between the components upstream of the reflector 540 and the components downstream of the reflector 540. To facilitate subsequent discussion about the azimuthal orientations of various system components, the optical systems 100/500 is schematically separated into a source/detector segment that provides beam multiplexing and read-out beam detection, and a disc read/write segment that collimates and relays the multiplexed beam to the optical disc media. Referring again to FIGS. 1 and 3, the source/detector segment may include the optical components to the left of reflected port of the PBC array (e.g., to the left of common path label 180/580), whereas the disc read/write segment may include the optical components to the right of the common path label 180/580. Depending on where the location of the collimating lens 160/560, it may belong to either segment. In general, the disc read/write segment will include the reflector 540 and/or the light beams that are substantially circularly polarized.

Figure 1:
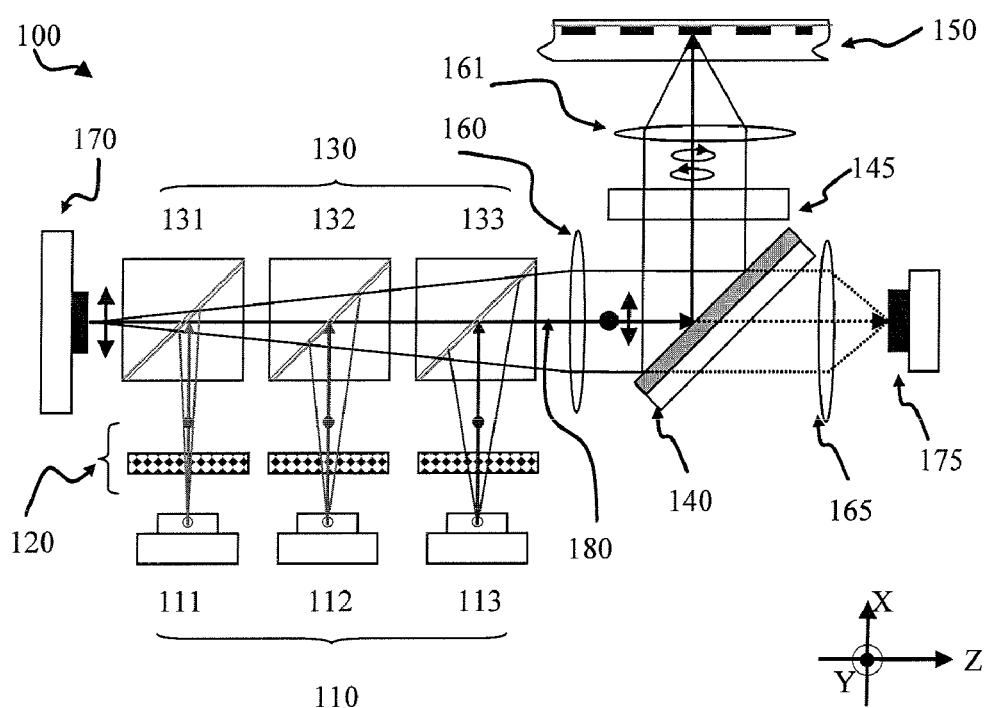
FIG. 1 shows one example of a prior art 3-wavelength HD-DVD/DVD/CD optical pick-up system.

In FIG. 1, the reflector 140 is shown folding the light path at a right angle (e.g., a polar angle of 90°) within the plane of FIG. 1 (e.g., with an azimuthal rotation of 0°) for illustrative purposes. In practice, it is more common for the light path to be folded up out of the plane of FIG. 1 (e.g., with an azimuthal rotation of 90°) to maintain the plane containing the optical components to the width/length dimension of a conventional optical disc tray and/or to direct the read/write light to the disc tray. Alternatively, the light path is folded at a polar angle of 90°, with an azimuthal rotation of −90°, 0° or 180°. In each case, the polar and/or azimuthal angle is described relative to the z-axis, using the RH-XYZ coordinate system.

Like the reflector 140 in the embodiment illustrated in FIG. 1, the reflector 540 illustrated in FIG. 3 folds the light path at a right angle (e.g., a polar angle of 90°). However, rather than using a 90° (or its 90° multiples) azimuthal offset, the PBCs 530 in FIG. 3 are angled such that there is a 45° (or its 90° multiples) azimuthal offset between the read/write and the source/detector segments (e.g., an azimuthal rotation of ±45°, ±135°). The disc read/write segment shares the same Z-axis with the source/detector segment up to the leaky fold mirror 540, at which point the local Z-axis takes a 90° direction change, along any one of the ±45° or ±135° azimuthal angles, with respect to common path 580.

Figure 5:
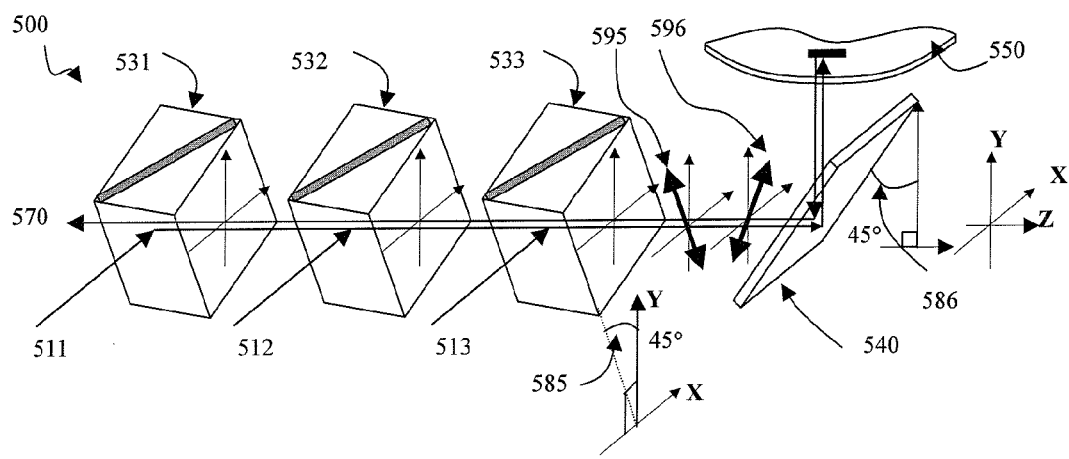
FIG. 5 is a perspective view illustrating the 45° relative azimuthal offset of the disc read/write segment versus the source/detector segment.

This 45° offset is more clearly illustrated in FIG. 5, via angle 585. More specifically, FIG. 5 shows that the source/detector segment has been rotated 45° CCW with respect to the RH-XYZ coordinate system. Consequently, the linear polarization (LP) at the common path is included at 135° azimuthal orientation. The common path has been folded at 90°, along the 90° azimuth with respect to the RH-XYZ coordinate system shown (illustrated by 586 angle). The XZ-plane is typically the disc tray plane in the optical disc system. The read/write beam is directed to the disc tray upwards. The linear polarization vectors of the first pass and second pass beam in the source/detector segment are depicted by the double arrows of 595 and 596, respectively. These polarization axes form an approximately ±45 degree offset with respect to the X- and Y-axes along the common beam path 580.

Conveniently, the ±45° azimuthal offset in optical system 500 relative to optical system 100 allows the reflector 540 to function as an achromatic QWP at the multiple wavelengths of disc access. More specifically, the ±45° offset accounts for the fact that the slow/fast axes of the AQWP coating are constrained to the tilt plane (and its orthogonal). The tilt plane is defined as the plane containing the tilt angle, such as YZ plane for the AQWP fold mirror 540 in FIG. 5. The actual alignment of the fast/slow axes is dependent on the sign of the C-plate retardance: for a +C-plate element, the slow-axis (SA) is aligned parallel to the tilt-plane and its fast-axis (FA) is aligned parallel to the axis of rotation and vice versa for −C-plate element.

Figure 6:
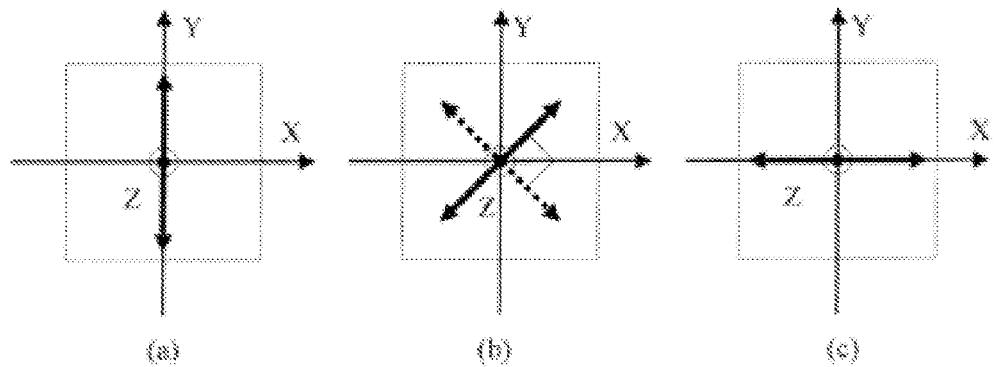
FIG. 6 illustrates the azimuthal orientations of the first pass beam LP, slow/fast axes of the AQWP, and the second pass beam LP for the configuration illustrated in FIG. 1.
Figure 7:
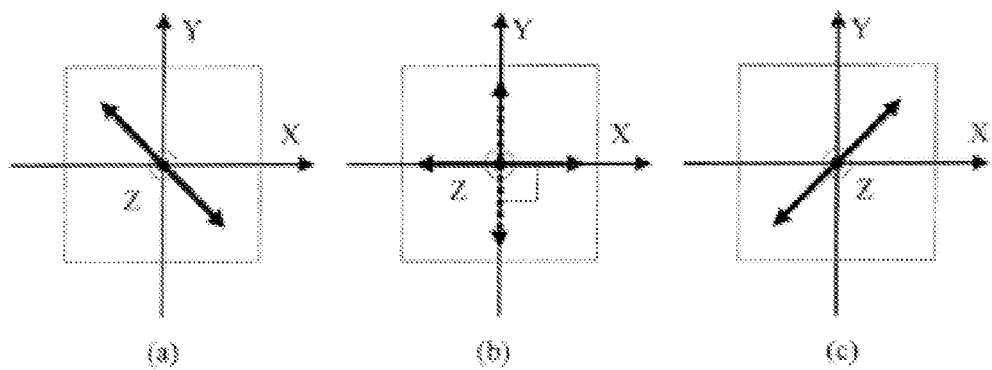
FIG. 7 illustrates the azimuthal orientations of the first pass beam LP, slow/fast axes of the AQWP, and the second pass beam LP for the configuration illustrated in FIG. 3.

The azimuthal orientations of the first pass beam LP, slow/fast axes of the AQWP, and the second pass beam LP, are shown in FIGS. 6 and 7 for configurations 100 and 500, respectively.

In FIG. 1, the multiplexed laser beam in the source/detector segment transmitted from the PBC 133 is orthogonal to the plane of drawing (i.e., S-polarized with respect to the PBC hypotenuse), whereas the read-out beam transmitted to the PBC 133 is parallel to the plane of drawing (i.e., P-polarized with respect to the PBC hypotenuse). These two azimuthal orientations are depicted in FIG. 6 as a and c, respectively. The slow-axis of the achromatic QWP 145, shown as the solid double-array in b, is aligned at 45° counter clockwise (CCW), with respect to the positive X-axis, also parallel to the p-plane of the PBC hypotenuse. As a result, a left-handed circularly polarized beam exits from the AQWP 145 (with the assumption of intuitive RH-XYZ coordinate system while looking at the beam coming to the observer). The fast-axis of the AQWP 145 is 90° azimuthal offset from the slow-axis of AQWP 145. This is shown as the dashed double-array in b of FIG. 6, which is aligned at 45° clockwise (CW), with respect to the positive X-axis, also parallel to the p-plane of the PBC hypotenuse. As discussed above, it is assumed that the disc read/write segment is azimuthally offset from the source/detector segment by any multiple of 90° from the nominal offset of 0 degrees. All azimuthal angle reference is with respect to the global RH-XYZ coordinate system.

In FIG. 3, the multiplexed laser beam in the source/detector segment transmitted from the PBC 533 has its electric field vector is substantially perpendicular to the Z axis and at a +45 degree angle from the Y axis (i.e., S-polarized with respect to the PBC hypotenuse, which is rotated by 45 degrees CCW about the Z-axis). The read-out beam transmitted to the PBC 533 has its electric field vector is substantially perpendicular to the Z axis and at a –45 degree angle from the Y axis (i.e., P-polarized with respect to the PBC hypotenuse, which has been rotated by 45 degrees CCW about the Z-axis). These two azimuthal orientations are depicted in FIG. 7 as a and c, respectively. The slow-axis of the AQWP 540, is shown as the solid double-array in b, whereas the fast-axis of the AQWP 540 is shown as the dashed double-array in b of FIG. 7. As discussed above, it is assumed that the disc read/write segment is azimuthally offset from the source/detector segment by ±45 degrees (modulo 90 degrees). All azimuthal angle reference is with respect to the global RH-XYZ coordinate system.

It is noted that for an OPU system utilizing polarization beam combiners in the source/detector segment, the nominal ±45 degree azimuthal plane offset also results in an equivalent plane of incidence offset between the source/detector segment and the read/write segment. This OPU system arrangement enables the substantially 90 degree phase retardance of the reflective AQWP/fold mirror to be utilized for conversion of linear polarization in the source/detector segment to circular polarization in the read/write segment in the first pass and vice versa for the second pass. It is also noted that the reflective AQWP/fold mirror, shown with its fast axis aligned parallel to the tilt plane of the fold mirror, is only an illustrative fast/slow axes assignment versus the tilt plane. In general, any or all wavelength channels in a multiple-channel OPU system may assume the opposite set of fast/slow assignment (i.e., one that has the slow-axis aligned parallel to the tilt plane) than the illustration shown in FIG. 7. This assignment freedom and/or mixture for different wavelength channels does not impair the 90 degree linear polarization rotation function upon double passing of the reflective AQWP/fold mirror from laser source to optical disc and back to detector.

Figure 8:
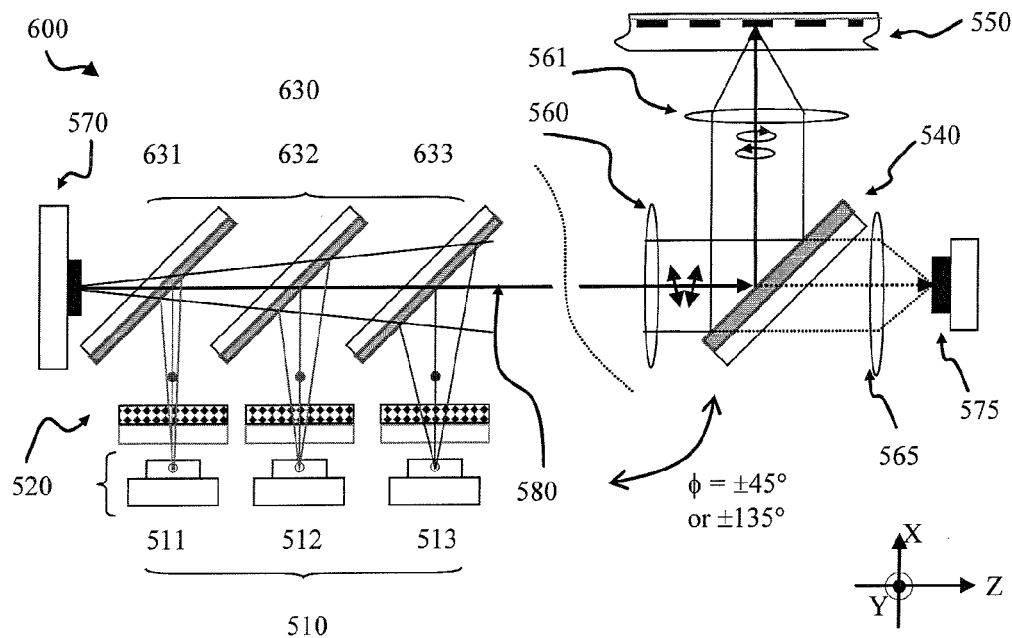
FIG. 8 shows an OPU in accordance with another embodiment of the instant invention utilizing plate polarization beam combiners.

Referring to FIG. 8, there is shown another embodiment of an OPU system 600 in accordance with the instant invention. The OPU system 600 includes at least one light source 510, an array of protection filters 520, a leaky mirror 540, a rotating optical disc 550, a collimating lens 560, an objective lens 561, a focusing lens 565, a main photodiode 570, and a monitor photodiode 575, as described with reference to optical system 500 illustrated in FIG. 3. In addition, the OPU system 600 also includes an array of plate polarizers 630, including a first polarizer 631, a second polarizer 632, and a third polarizer 633.

Each polarizer in the array of plate polarizers 630 is a polarization beam combiner (PBC) utilizing the non-normal incidence properties of dielectric coatings (e.g., edge filters) to provide separated S- and P-reflection spectra at a nominal 45° angle of incidence (AOI). For example, at a 45° AOI in air, the effective index ratio (e.g., high index vs. low index) in the thin film stack for S-pol. light is increased, while the effective index ratio for P-pol. is decreased vs. the index ratio at normal incidence. Consequently, the bandwidth associated to the S-pol. is increased and the bandwidth associated with the P-pol. is decreased. This opens up a wavelength window in which any one of the multiple LD sources 510 can be located, wherein the thin film provides for a high S-pol. reflection and high P-pol. transmission.

In a forward propagating direction, the first PBC plate 631 couples light $\lambda_1$ from the first LD 511 to the common path 580 by reflecting S-polarized light at $\lambda_1$. In a backward propagating direction, the first PBC plate 631 transmits P-polarized light at $\lambda_1$, as well as transmitting the P-polarized light at $\lambda_2$ and $\lambda_3$, which are associated with LD 512 and 513, respectively. Similarly, PBC plate 632 couples $\lambda_2$ to the common path 580 by reflecting S-polarized light at $\lambda_2$ and transmitting P-polarized light at $\lambda_1$, $\lambda_2$ and $\lambda_3$ as well as transmitting S-polarized and at $\lambda_1$, while PBC plate 633 couples $\lambda_3$ to the common path 580 by reflecting S-polarized light at $\lambda_3$ and transmitting P-polarized light at $\lambda_1$, $\lambda_2$ and $\lambda_3$ as well as transmitting S-polarized and at $\lambda_1$ and $\lambda_2$. In general, the surface of each PBC plate facing the filters 520 will be coated with the high reflection edge filter design, while the second opposing surface of the substrates will be coated with an AR coating to increase the S-polarized light transmittance. Notably, the P-polarized light transmittance will already be high because the angle of incidence is near Brewster's angle for the glass substrate.

Figure 9:
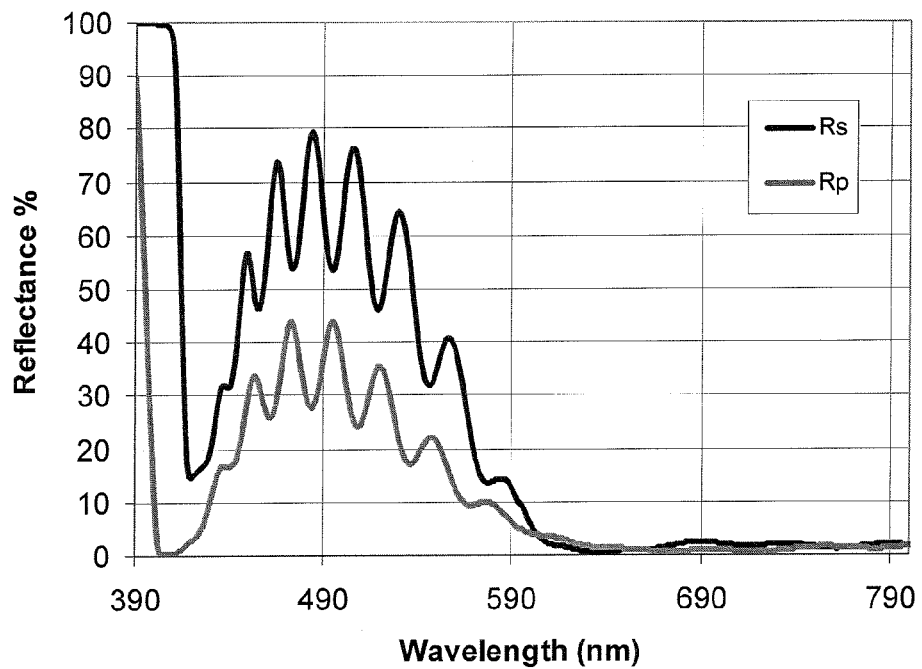
FIG. 9 shows the theoretical reflectance of a PBC plate at 45 degrees in a ±5 degree cone that reflects S-polarized light and transmits P-polarized light over a band at 405 nm, and that transmits both S- and P-polarized light over the bands at 660 nm and 780 nm.

The theoretical reflectance spectra of one example of a PBC plate suitable for use at a 45 degree angle of incidence is shown in FIG. 9. The PBC plate reflects S-polarized light and transmits P-polarized light in a wavelength band about 405 nm, and also transmits both S- and P-polarized light over bands at about 660 nm and 780 nm. Accordingly, this plate meets spectral reflectivity functionality of the plate polarizer 633 used for coupling the blue-violet laser beam into the common path, while appearing transparent to any polarization light of other wavelength channels. It is noted that each plate polarizer only has to be transparent to the S-polarized light of wavelength channels located upstream in the common path (e.g., to the left of 633 in FIG. 8). Each plate polarizer also has to reflect S-polarization of the wavelength channel where the plate polarizer is used as a beam combiner/splitter as well as passing by transmission P-polarized light of all wavelength channels.

Advantageously, the manufacture of these PBC plates does not require a large number of surfaces to be coated (e.g., in contrast to immersed-type polarizer cubes), and thus is more cost effective. In addition, since the PBC plate substrates are relatively thin, heat-induced birefringence is reduced (e.g., especially in read- or erase-mode of recordable/rewriteable optical disc media access). Further advantageously, the use of PBC plates 630 with the reflective AQWP 540 and/or tilted edge filters 520 increases the number of all-dielectric components in the optical system, thus providing a high-reliability OPU.

Unfortunately, the configuration illustrated in FIG. 8 potentially degrades the modulation transfer function (MTF)

of the OPU system due to the associated astigmatism and coma aberrations of imaging a converging/divergent cone through tilted plates. When a plate is used tilted with respect to the optical axis, there exists two focal lines along the tangential plane (also parallel to the plane of incidence, 'P' of the tilted plate) and along the sagittal plane (also perpendicular to the plane of incidence, 'S' of the tilted plate). This is astigmatism. The image points between the sagittal focus and tangential focus vary through circular/elliptical shapes. This aberration is a result of the incidence asymmetry at the titled plate for each ray angle at the same polar angle but at opposite azimuth of the cone. A secondary effect of the use of the tilted plate is a comet-like fare along the tilted plane for each object point. In this case, the object point is imaged with a slightly different magnification. This is the coma aberration.

Figure 10:
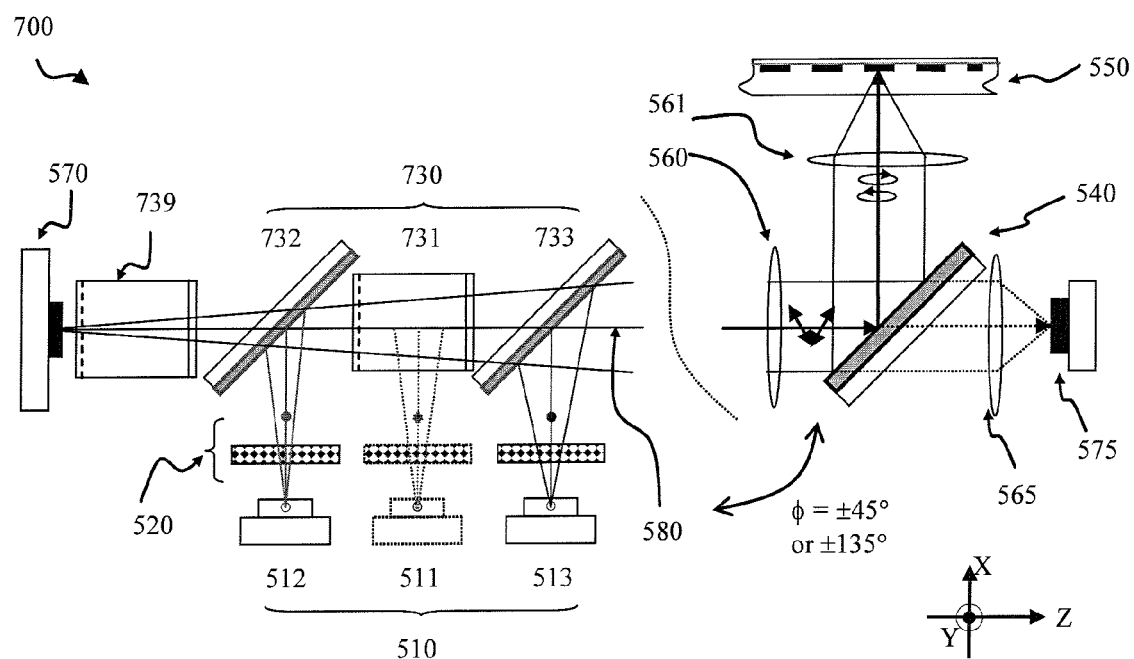
FIG. 10 shows an OPU in accordance with yet another embodiment of the instant invention utilizing plate polarization beam combiners.

Referring to FIG. 10, there is shown another embodiment of an OPU system 700 in accordance with the instant invention that compensates for astigmatism. The OPU system 700 includes at least one light source 510, an array of protection filters 520, a leaky mirror 540, a rotating optical disc 550, a collimating lens 560, an objective lens 561, a focusing lens 565, a main photodiode 570, and a monitor photodiode 575, as described with reference to optical system 500 illustrated in FIG. 3. In addition, the OPU system 700 includes a first plate polarizer 731, a second plate polarizer 732, a third plate polarizer 733, and a fourth plate 739. The plate polarizers 731-733 are similar to the plate polarizers 631-633 described with reference to FIG. 9. The plate 739 is designed such that is approximately matched in thickness and refractive index to the plates used in the plate polarizers 731-733. The plates 731-733 and 739 are arranged such that each successive thin plate is rotated approximately ±45 degrees about orthogonal coordinate axes. More specifically, the first plate polarizer 731 and the fourth plate 739 are oriented such that the roles of sagittal and tangential planes are switched on successive transmission through the plates 731-733 and 739.

Figure 11A:
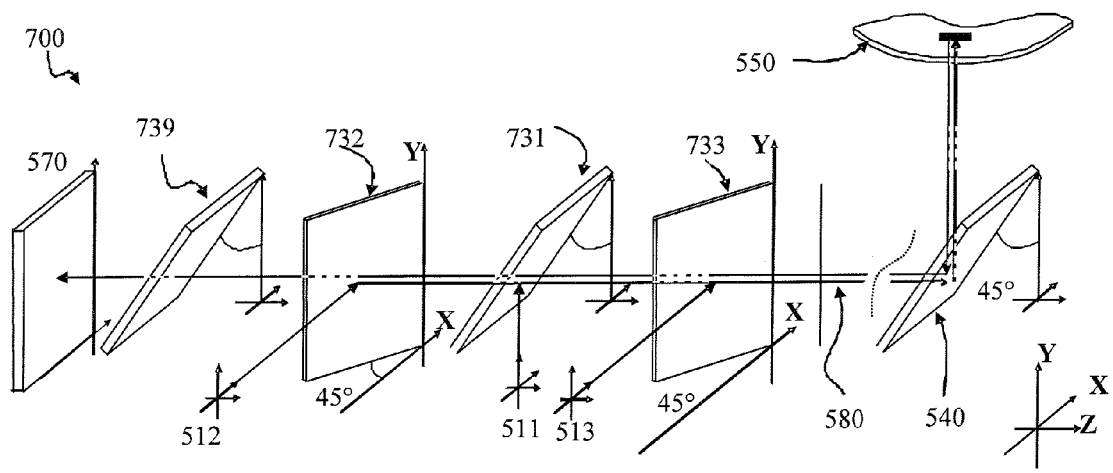
FIG. 11A is a perspective view of the configuration illustrated in FIG. 10.
Figure 11B:
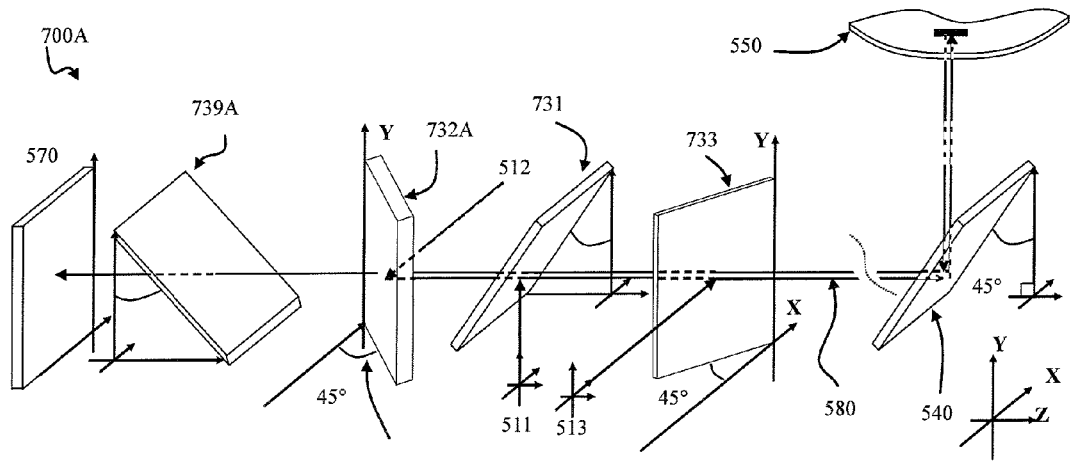
FIG. 11B is a perspective view of an alternate configuration of the OPU illustrated in FIG. 10.

The arrangement of the alternating polarizing beam combiners (PBC) tilted at orthogonal axes is further illustrated in the perspective view shown in FIG. 11A. Notably, both tilted plate PBCs 732 and 733 have been shown with a –45 degree rotation about the Y-axis (from being nominally parallel to the XY plane). According to another embodiment illustrated in FIG. 11B, the configuration 700A is designed such that plate PBC 732A is rotated about +45 degree, while plate PBC 733 through –45 degree about the Y-axis to further reduce astigmatism. In FIGS. 11A and 11B the ±45 degree offset between the read/write and the source/detector segments is shown implicitly.

In operation, linearly polarized light from LD 513 (e.g., the blue channel) is transmitted as polarized light (e.g., S-polarized light), is reflected by the plate polarizer 733, is directed along common optical path 580 to the collimating lens 560, the leaky mirror 540, the objective lens 561, and the optical disc 550, where it is reflected. After a double pass through the leaky mirror 540, the reflected light is transformed into linearly polarized having a polarization state orthogonal to the light reflected from the LD 513. This linearly polarized light is transmitted through four plates (e.g., 733, 731, 732/732A, and 739/739A) before reaching the detector 570. Similarly, linearly polarized light from LD 512 (e.g., the red channel) is transmitted as polarized light (e.g., S-polarized light), is reflected by the plate beamsplitter 732, is transmitted through plate beam splitters 731 and 733 and is directed along common optical path 580 to the collimating lens 560, the leaky mirror 540, the objective lens 561, and the optical disc 550, where it is reflected. After a double pass through the leaky mirror 540, the reflected light is transformed into linearly polarized having a polarization state orthogonal to the light reflected from the LD 512. This linearly polarized light is passed through four plates (e.g., 733, 731, 732/732A, and 739/739A) before reaching the detector 570. Finally, linearly polarized light from LD 511 (e.g., the NIR channel) is transmitted as polarized light (e.g., S-polarized light), is reflected by the plate beamsplitter 731, is transmitted through plate beamsplitter 733 is directed along common optical path 580 to the collimating lens 560, the leaky mirror 540, the objective lens 561, and the optical disc 550, where it is reflected. After a double pass through the leaky mirror 540, the reflected light is transformed into linearly polarized having a polarization state orthogonal to the light reflected from the LD 511. This linearly polarized light is transmitted through four plates (e.g., 733, 731, 732/732A, and 739/739A) before reaching the detector 570.

Notably, light transmitted from both the blue channel (i.e., LD 513) and the red channel (i.e., LD 512) are passed through an even number of plates in the first pass. Accordingly, a negligible amount of astigmatism is induced. In contrast, the NIR channel (i.e., LD 511) is passed through an odd number of plates, causing astigmatic aberrations. However, since the NIR channel corresponds to a relatively long wavelength, the aberration is not as critical as it would be for the blue and/or red channels. Optionally, an additional plate is disposed between the NIR LD 511 and the corresponding PBC 731.

Advantageously, selecting the plate tilt angle, plate thickness, plate optical index and the plate separation provides a system wherein the astigmatism is self-compensated.

Figure 12:
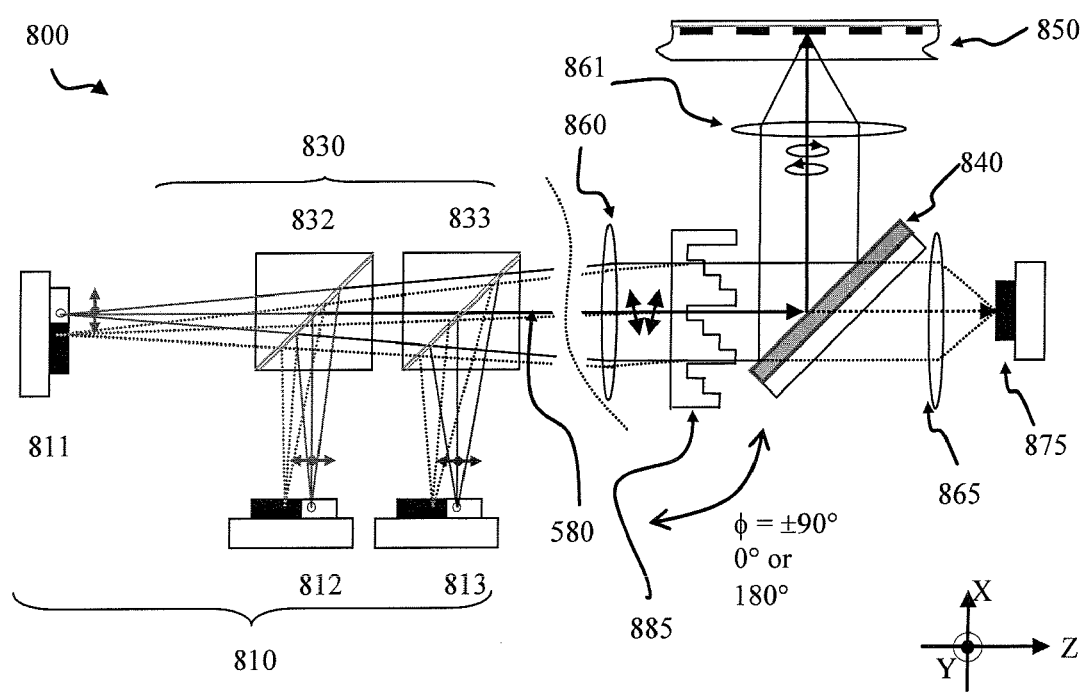
FIG. 12 shows an OPU in accordance with another embodiment of the instant invention.

Referring to FIG. 12, there is shown another embodiment of an OPU system 800 in accordance with the instant invention. The OPU system 800 includes an array of integrated source/detector units 810, an array of dichroic beam combiners 830, a leaky mirror 840, a polarizing hologram 885, a rotating optical disc 850, a collimating lens 860, an objective lens 861, a focusing lens 865, and a monitor photodiode 875.

The array of integrated source/detector units 810 includes a first unit 811, a second unit 812, and a third unit 813. Each integrated unit includes a light source, such as a LD, and a co-packaged photodetector, such as a photodiode (PD). The array of integrated units 810 provides the linearly polarized light beams at each of the OPU wavelengths (e.g., at 780 nm, 660 nm, and 405 nm, respectively). Alternatively, the array 810 includes more or less than three integrated units.

The array of dichroic beam combiners (DBCS) 830, which includes a first DBC 831, a second DBC 832, and a third DBC 833, is used to spatially multiplex the output from the integrated array 810 and directs it along a common light path 880. Each DBC 831/832/833 uses the dichroic interface sandwiched between two prisms to transmit or reflect light from the integrated array 810. Note that the DBCs are not polarization beam splitting cubes, but rather function as a type of dichroic band-pass filter to transmit and/or reflect the incident light in dependence upon the wavelength.

The reflector 840 redirects light transmitted from the DBCs 830 to the rotating optical disc 850. The reflector 840 includes a thin film coating that provides substantially quarter-wave retardation at the three OPU wavelengths (e.g., 405 nm, 660 nm and 780 nm). According to one embodiment, the thin film coating includes a plurality of alternating layers having contrasting refractive indices that are incorporated into a filter (e.g., short-wave pass or long-wave pass, band pass, high reflection, etc.) and deposited on a transparent substrate. The transparent substrate may be a parallel plate or a near 45° prism (e.g., the thin film coating may be deposited on the angled facet of a prism). In this embodiment, the filter functions a leaky mirror and allows for a small fraction (e.g., 5%)

of the incident beam energy to be tapped off and focused onto the monitor photodiode (PD) 875. In another embodiment, the high reflector redirects substantially all incident light, S-pol. and P-pol., to the orthogonal beam path towards the optical disc 550.

In this embodiment, the OPU 800 is configured such that the angular offset between the source/detector segment and the disc read/write segment is approximately 0 degree (as shown in FIG. 12), ±90, or 180 degrees (i.e., there is no ±45 degree offset as illustrated in FIG. 3). As a result, the performance of this optical system 800 is dependent on the polarization of the linearly polarized light emitted from the integrated units 810. Edge-emitting semiconductor laser diodes typically produce a linearly polarized output beam, parallel to the epitaxial layers. To account for the fact that the slow/fast axes of the AQWP coating are constrained to the tilt plane (and its orthogonal), the packaging of the LD sources requires a ±45 degree rotation of the laser chips about the output beam axis. Alternatively, a half-waveplate at the associated laser wavelength may be utilized to covert the 0 degree or 90 degree polarized light output beams to ±45 degree with respect to the chip regular XY cross-sectional dimension. In the embodiment illustrated in FIG. 12, the polarization is approximately half way between the Y and Z-axes for LD sources 812 and 813 and approximately half way between the X and Y-axes for LD source 811 (e.g., which is shown as approximately equal parts S-polarization and P-polarization via the use of a dot and double headed arrow).

The polarizing hologram 885 is designed to diffract light reflected from the optical disc 850 at the one or more different wavelengths (e.g., at 780 nm, 660 nm, and 405 nm) so that the reflected beams are directed to the PD portion of the integrated units rather than the LD portion. Polarizing holograms, which for example may include a diffraction grating formed on a birefringent substrate, are well known in the art, and are not discussed in further detail. It is noted that polarization selective linear directions of the polarizing hologram are aligned parallel to the first linear polarization for non-diffraction in the first pass, and parallel to the second linear polarization for diffraction in the second pass. In general, the diffraction plane (also grating vector) of the polarizing hologram can be configured to any arbitrary azimuth. Advantageously, the diffraction plane is aligned parallel (as shown in FIG. 12) or orthogonal (not shown) to the plane of incidence of reflector 840. In this case, the polarization selective directions are aligned at ±45 degree from the grating lines of the polarizing hologram. More preferably, the diffraction plane is aligned at ±45 degrees with respect to the plane of incidence of reflector 840 (not shown here). In this case, the polarization selective directions are aligned at 0 and 90 degree from the grating lines of the polarizing hologram. This diffraction plane configuration allows for co-packaged LD and PD integrated unit to be rotated synchronously by ±45 degrees. The remaining optical components, including the collimating lens 860, the objective lens 861, the focusing lens 865, and the photodiode 575, are similar to those used in the prior art.

In operation, linearly polarized light from integrated unit 811 is transmitted through the array of DBCs 830 and directed along common optical path 880. The linearly polarized light is then collimated by collimating lens 860, passed through polarizing hologram 885 undiffracted, and transmitted to the leaky mirror 840 having the AQWP coating. The leaky mirror 840 transforms the linearly polarized light into circularly polarized light and redirects it to the optical disc 850 via the objective lens 861. Light reflected by the optical disc 850 is retransmitted through the objective lens 861 and is reflected from the reflector 840 through the polarizing hologram 885 towards the collimating lens 860. Since the reflector 840 having the AQWP coating changes the polarization state of the linearly polarized light upon double passing there through, the polarizing hologram 885 diffracts the reflected light so that it optical path is slightly shifted and the linearly polarized light is imaged onto the photodiode portion of the integrated unit 811.

Similarly, linearly polarized light from integrated unit 812 is reflected from the first DBC 832, passed through the second DBC 833, and directed along common optical path 880. The linearly polarized light is then collimated by collimating lens 860, passed through polarizing hologram 885 undiffracted, and transmitted to the leaky mirror 840 having the AQWP coating. The leaky mirror 840 transforms the linearly polarized light into circularly polarized light and redirects it to the optical disc 850 via the objective lens 861. Light reflected by the optical disc 850 is retransmitted through the objective lens 861 and is reflected from the reflector 840 through the polarizing hologram 885 towards the collimating lens 860. Since the reflector 840 having the AQWP coating changes the polarization state of the linearly polarized light upon double passing there through, the polarizing hologram 885 diffracts the reflected light so that its optical path is slightly shifted and the linearly polarized light is imaged onto the photodiode portion of the integrated unit 812.

Finally, linearly polarized light from integrated unit 813 is reflected from the second DBC 833 and is directed along common optical path 880. The linearly polarized light is then collimated by collimating lens 860, passed through polarizing hologram 885, and transmitted to the leaky mirror 840 having the AQWP coating. The leaky mirror 840 transforms the linearly polarized light into circularly polarized light and redirects it to the optical disc 850 via the objective lens 861. Light reflected by the optical disc 850 is retransmitted through the objective lens 861 and is reflected from the reflector 840 through the polarizing hologram 885 towards the collimating lens 860. Since the reflector 840 having the AQWP coating changes the polarization state of the linearly polarized light upon double passing there through, the polarizing hologram 885 diffracts the reflected light so that its optical path is slightly shifted and the linearly polarized light is imaged onto the photodiode portion of the integrated unit 813.

Alternatively, the single polarizing hologram 885 located in the common path 880 may be replaced by multiple polarizing holograms, each located between the source LD and its associated dichroic beam combiner. In this case, the series of dichroic beam combiners and the fold mirror can be designed to provide a net quarter-wave retardance at each laser wavelength (e.g., the phase shift inherently provided by dichroic beam combiners is taken into consideration when designing the coating on the fold mirror). Each polarizing hologram is located in a linear-polarization beam segment. The series of dichroic beam combiners and the fold mirror allow the linear polarization to evolve from linear, through an elliptical intermediate state to finally output a circular polarization beyond the fold mirror in the first pass, and provide for the reverse circular to linear polarization conversion in the second pass. This net ±90 degree phase shift is made possible by having all the S- and P-planes of the series of coated surfaces aligned parallel or orthogonal, in addition to not using any polarizers as beam combining means. Alternatively, if the fold mirror is designed to provide a ±90 degree phase retardance regardless of the one or more polarizing holograms being utilized, the series of dichroic beam combiners can be designed to provide a 0 net retardance at each laser beam traversing from the LD output to just prior to the fold mirror (i.e., individual dichroic beam combiners do not have to provide a 0 degree phase shift as long as the series of be am combiners provides a 0 net retardance).

Figure 13:
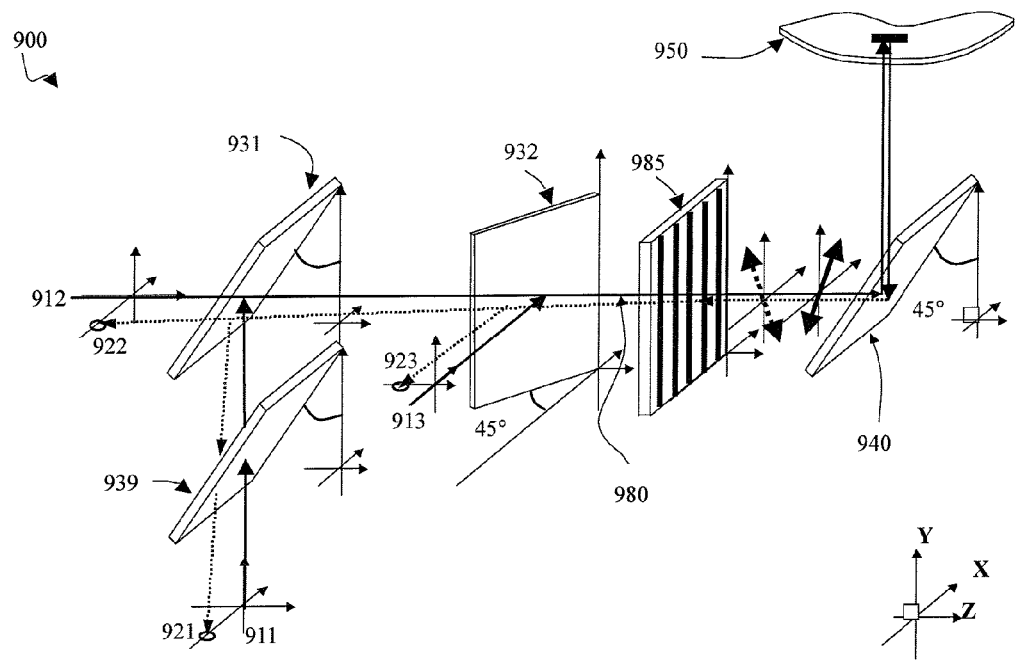
FIG. 13 shows an OPU in accordance with yet another embodiment of the instant invention.

Referring to FIG. 13, there is shown another embodiment of an OPU system 900 in accordance with the instant invention. The OPU system 900 includes a first integrated source/detector unit 911/921, a second integrated source/detector unit 912/922, a third integrated source/detector unit 913/923, a first plate dichroic beam combiner 931, a second plate dichroic beam combiner 932, a plate 939 for reducing astigmatism, a fold mirror 940, a polarizing hologram 985, a rotating optical disc 950, and an objective lens 961 (not shown).

Each integrated unit includes a light source, such as a LD, and a co-packaged photodetector, such as a photodiode (PD). The integrated units 910 provide the linearly polarized at each of the OPU wavelengths (e.g., at 780 nm, 660 nm, and 405 nm, respectively) having the predetermined polarization.

The plate dichroic beam combiners (DBCs) are used to spatially multiplex the output from the integrated arrays and direct it along a common light path 980. Each plate DBC includes a dichroic coating for passing or reflecting light in dependence upon the wavelength. Advantageously, the plate DBCs allow obviates the difficulty in designing and fabricating cubic DBCs in immersed incidence that transmit S-pol. and reflect P-pol. efficiently.

The reflector 940 redirects light transmitted from the plate DBCs to the rotating optical disc 950. The reflector 940 includes a thin film coating that provides substantially quarter-wave retardation at the three OPU wavelengths (e.g., 405 nm, 660 nm and 780 nm). According to one embodiment, the thin film coating includes a plurality of alternating layers having contrasting refractive indices that are incorporated into a filter (e.g., short-wave pass or long-wave pass, band pass, high reflection, etc.) and deposited on a transparent parallel-plate substrate.

In this embodiment, the OPU 900 is also configured such that the angular offset between the source/detector segment and the disc read/write segment is approximately 0 degree (as shown in FIG. 13), ±90, or 180 degrees (i.e., there is no ±45 degree offset as illustrated in FIG. 3). As a result, the performance of this optical system 900 is dependent on the polarization of the linearly polarized light emitted from the integrated units 911/912/913. Edge-emitting semiconductor laser diodes typically produce a linearly polarized output beam, parallel to the epitaxial layers. To account for the fact that the slow/fast axes of the AQWP coating are constrained to the tilt plane (and its orthogonal), the packaging of the LD sources requires a ±45 degree rotation of the laser chips about the output beam axis. Alternatively, a half-waveplate at the associated laser wavelength may be utilized to covert the 0 degree or 90 degree polarized light output beams to ±45 degree with respect to the chip regular XY cross-sectional dimension. In the embodiment illustrated in FIG. 13, the polarization is approximately half way between the Y and Z-axes for LD source 913, approximately halfway between the X and Z-axes for LD source 911, approximately half way between the X and Y-axes for LD source 912 (i.e., approximately equal parts S-polarization and P-polarization with respect to each associated dichroic beam combiner).

The polarizing hologram 985 is designed to diffract light reflected from the optical disc 950 at the one or more different wavelengths (e.g., at 780 nm, 660 nm, and 405 nm) so that the reflected beams are directed to the PD portion of the integrated units rather than the LD portion. Polarizing holograms, which for example may include a diffraction grating formed on a birefringent substrate, are well known in the art, and are not discussed in further detail. It is noted that polarization selective linear directions of the polarizing hologram are aligned parallel to the first linear polarization for non-diffraction in the first pass and parallel to the second linear polarization for diffraction in the second pass. In general, the diffraction plane (also grating vector) of the polarizing hologram can be configured to any arbitrary azimuth. Advantageously, the diffraction plane is aligned orthogonal (as shown in FIG. 13) or parallel (not shown) to the plane of incidence of reflector 940. In this case, the polarization selective directions are aligned at ±45 degree from the grating lines of the polarizing hologram. The remaining optical components, including the collimating lens (not shown) and the objective lens (not shown), are similar to those used in the prior art.

Figure 14:
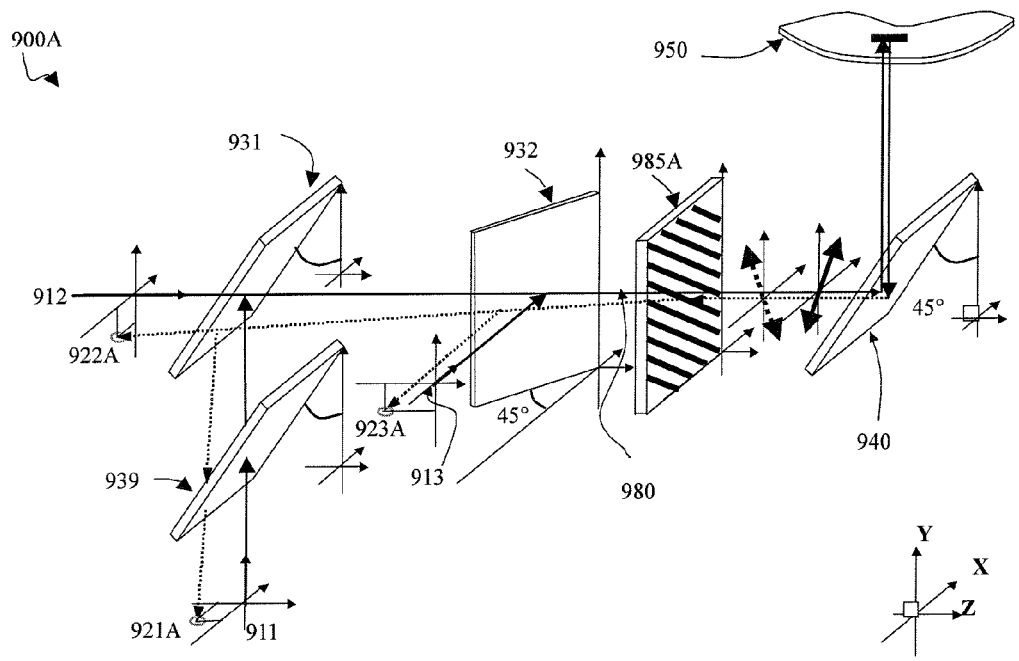
FIG. 14 shows an OPU in accordance with yet another embodiment of the instant invention.

More preferably, the diffraction plane is aligned at ±45 degrees with respect to the plane of incidence of reflector 940, as illustrated by OPU system 900A and shown in FIG. 14. With the exception of polarizing hologram 985A and photodetectors 921A, 922A and 923A, all other optical elements in system 900A are the same as those illustrated in system 900.

Polarizing hologram 985A is configured to have the grating lines diagonal to the X- and Y-axis along the XY plane. In comparison, polarizing hologram 985 is configured to have the grating lines parallel (shown in FIG. 13) or orthogonal (not shown) to the Y-axis along the XY plane. Photodetectors 921A, 922A and 923A are located diagonally along XZ-, XY- and YZ-planes, respectively. In comparison, photodetectors 921, 922 and 923 are located along one or more of X-, Y- and Z-axes. In this configuration, the polarization selective directions are aligned at 0 and 90 degree from the grating lines of the polarizing hologram. This diffraction plane configuration allows for co-packaged LD and PD integrated unit to be rotated synchronously by ±45 degrees.

In operation, linearly polarized light from the integrated units in both optical system layouts of 900 and 900A is passed through the array of DBCs and directed along common optical path 980. The linearly polarized light is collimated by the collimating lens (not shown), passed through the polarizing hologram 985/985A, and transmitted to the leaky mirror 940 having the AQWP coating. The leaky mirror 940 transforms the linearly polarized light into circularly polarized light and redirects it to the optical disc 950 via the objective lens (not shown). Light reflected by the optical disc 950 is retransmitted through the objective lens (not shown) and is reflected from the reflector 940 through the polarizing hologram 985/985A towards the collimating lens (not shown). Since the reflector 940 having the AQWP coating changes the polarization state of the linearly polarized light upon double passing there through, the polarizing hologram 985/985A diffracts the reflected light so that it optical path is slightly shifted and the linearly polarized light is imaged onto the photodiode portion of the corresponding integrated unit.

Alternatively, the single polarizing hologram 985/985A located in the common path 980 may be replaced by multiple polarizing holograms, each located between the source LD and its associated dichroic beam combiner. In this case, the series of dichroic beam combiners and the fold mirror can be designed to provide a net quarter-wave retardance at each laser wavelength (e.g., the phase shift inherently provided by dichroic beam combiners is taken into consideration when designing the coating on the fold mirror). Each polarizing hologram is located in a linear-polarization beam segment. The series of dichroic beam combiners and the fold mirror allow the linear polarization to evolve from linear, through an elliptical intermediate state to finally output a circular polarization beyond the fold mirror in the first pass, and provide for the reverse circular to linear polarization conversion in the second pass. This net ±90 degree phase shift is made possible by having all the S- and P-planes of the series of coated surfaces aligned parallel or orthogonal, in addition to not using any polarizers as beam combining means. Alternatively, if the fold mirror is designed to provide a ±90 degree phase retardance regardless of the one or more polarizing holograms being utilized, the series of dichroic beam combiners can be designed to provide a 0 net retardance at each laser beam traversing from the LD output to just prior to the fold mirror (i.e., individual dichroic beam combiners do not have to provide a 0 degree phase shift as long as the series of beam combiners provides a 0 net retardance).

In each of the embodiments described in FIGS. 3, 8, 10, 12, 13, and 14 the PBC/DBC array spatially multiplexes the light transmitted from the three light sources and directs the multiplexed beam of light in a first direction parallel to a first axis (e.g., the global Z-axis). The fold mirror having the AQWP coating reflects light transmitted in the first direction in a second direction parallel to a second axis (e.g., the global Y-axis) so that it is transmitted through an objective lens and is focused onto the optical disc. Light reflected from the optical disc is retransmitted through the objective lens and is reflected again by the fold mirror. After being reflected from the fold mirror twice, the polarization of the multiplexed light will be transformed to an orthogonal polarization and thus will be diverted away from the originating light source to an optical detector (e.g., via the PBC or the polarizing hologram).

Advantageously, each of these configurations allows the electric field vector (i.e., the polarization) of the multiplexed beam of light (or its components) incident on the fold mirror to be substantially perpendicular to the first axis (e.g., the global Z-axis) and at an oblique angle (e.g., 45 degrees) to the second axis (e.g., the global Y-axis). For example in the embodiments illustrated in FIGS. 3, 8, and 10, a 45 degree azimuthal offset is provided between the read/write segment and the source/detector segment, whereas in the embodiments described with reference to FIGS. 12, 13 and 14, the laser sources themselves are rotated (e.g., integrated unit 811 is rotated about the local optical beam axis). Accordingly, the multiplexed beam (or its components) will strike the fold mirror in a manner that accounts for the fact that the slow/fast axes of the AQWP coating are constrained to the tilt plane (and its orthogonal), thus providing efficient linear to circular polarization conversion. Since these configurations use the AQWP coating efficiently, the need for a conventional stand-alone AQWP is obviated, and the number of components required is reduced.

Further advantageously, since the PBC/DBC arrays and the fold mirror are disposed along the same axis (e.g., the Z-axis), alignment of the read/write and the source/detector segments is relatively easy. In particular, it is relatively easy to provide a 45 degree azimuthal offset between the read/write and the source/detector segments. Moreover, by positioning the PBC/DBC arrays and the fold mirror along the same axis, the optical layout is readily expanded to accommodate additional wavelength channels. Another significant advantage of positioning the PBC/DBC array and the fold mirror along the same axis, or in the same plane (e.g., YZ), is that it obviates the need for the plate beam splitter taught by Moon et al. Accordingly, the system is less lossy and less complex.

Figure 15:
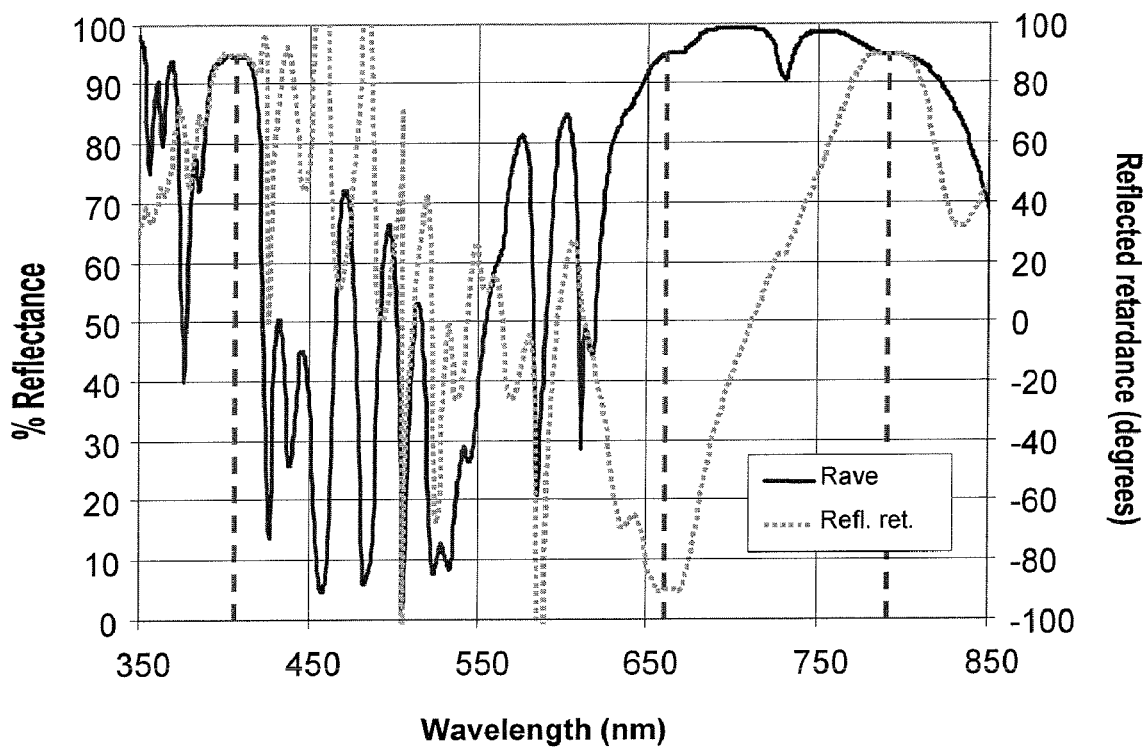
FIG. 15 shows the theoretical reflectance and reflected retardance at 45 degrees angle of incidence of a design that has 90 degree retardance (e.g., functions as an achromatic QWP) at three wavelengths: 405 nm, 660 nm and 780 nm, as indicated by the vertical dashed lines.

In each of the above embodiments, the AQWP coatings are preferably designed such that the thin film C-plate coating that provides substantially quarter-wave retardation at the three OPU wavelengths (e.g., 405 nm, 660 nm and 780 nm) is incorporated into a thin film coating designed as a high reflector. Accordingly, quarter-wave retardation at the three OPU wavelengths (and/or additional wavelengths) is readily achieved. More specifically, it has been found that integrating the C-plate function and the high reflector function provides greater control in designing a broad and/or relatively flat retardance profile within the bandwidth of each wavelength channel. In addition, this integration allows the reflective AQWP to be designed as a leaky mirror. Some examples of suitable thin film coatings are illustrated in FIGS. 15 and 16. The three-wavelength band design is targeted at BD/MD-DVD, DVD and CD optical disc drive system. The reflectance within each wavelength center, having a ±2% bandwidth, is approximately 95%, accounting for 5% tapped off output. The reflected retardance in blue and NIR channels are approximately +90 degrees whereas the retardance value in the red channel is −90 degrees. The sign difference means that the reflected AQWP has a slow-axis aligned parallel to the tilt plane at the blue/NIR channels while the fast axis is aligned parallel to the tilt plane in the red channel. The retardance sign difference means that there is a corresponding sign change in the circular polarization generated after first pass through the reflected AQWP. However, the required 90 degree linear polarization rotation on double passing is achieved with both ±90 degree retardance, provided there is an approximately ±45 degree incoming linear polarization axis offset to the tilt plane.

Figure 17:
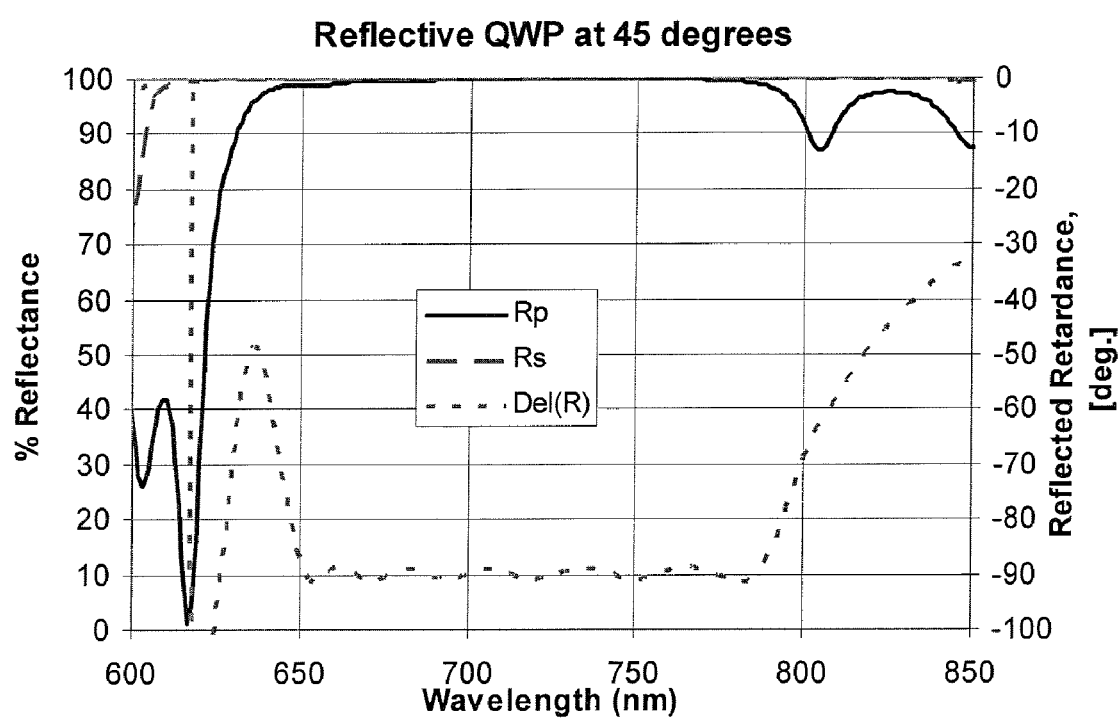
FIG. 17 shows a theoretical reflectance for S-pol. and P-pol. light and reflected retardance spectra for a reflective AQWP/fold mirror design according to an embodiment of the present invention that provides for a high reflectivity as well as approximately −90 degree retardance at the DVD/CD wavelengths of 660 nm and 780 nm.

Yet another example of a suitable thin film coating targeting a legacy two-wavelength DVD/CD optical disc drive system is demonstrated in FIG. 17. As shown by the simulation plots, the high reflector coating can be designed to reflect essentially 100% light for both S-pol. and P-pol. inputs while imposing a constant 90-degree retardance to the reflected light from 650 nm to 790 nm wavelengths. Such a wide-band design, in contrast to prior-art phase shift coating designs, is tolerant to fabrication errors.

In each of the above embodiment, the AQWP coatings are typically fabricated using vacuum deposition techniques including, but not limited to chemical vapor deposition (CVD), plasma enhanced CVD, electron beam evaporation, thermal evaporation, sputtering, and/or atomic layer deposition. Optionally, the coatings are deposited on a substrate that is transparent over the wavelength region of interest and, may be made from a wide variety of materials including, but not limited to, glass, quartz, and plastic. In general, the materials used for the thin films are inorganic or organic dielectric materials having indices of refraction in the range of 1.3 to greater than 4.0 at 550 nm. For example, some suitable materials include silica ($SiO_2$, n=1.46), tantala ($Ta_2O_5$, n=2.20), alumina ($Al_2O_3$, n=1.63), hafnia ($HfO_2$, n=1.85), ($TiO_2$, n=2.37), niobia ($Nb_2O_5$, n=2.19), and magnesium fluoride ($MgF_2$, n=1.38). Of course, other dielectric materials and/or polymers would serve as well. Optionally, the AQWP coating is designed with the aid of a commercially available computer program such as TFCalc™ by Software Spectra Inc.

Figure 2:
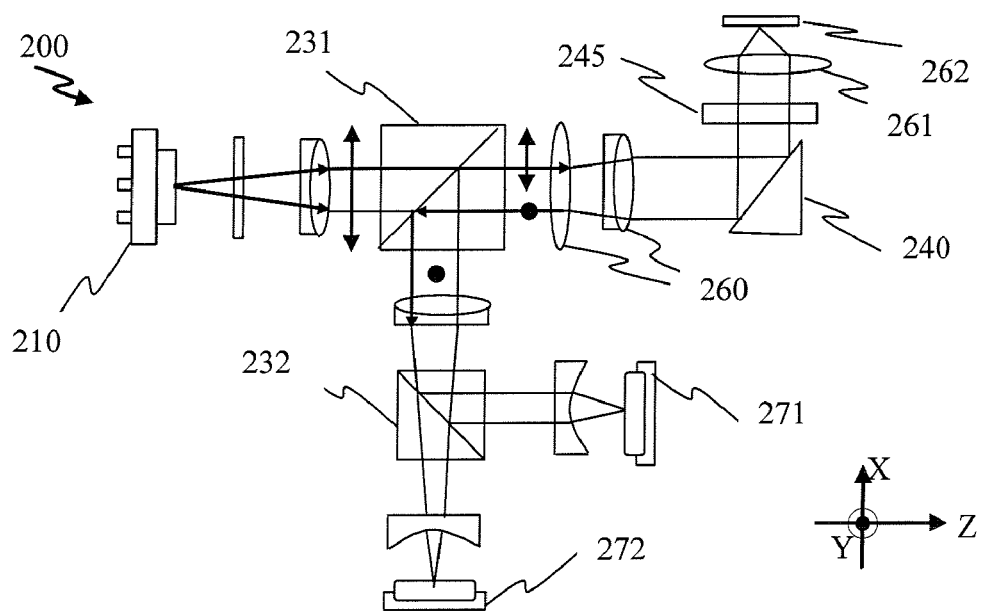
FIG. 2 shows another example of a prior art 3-wavelength HD-DVD/DVD/CD optical pick-up system.

Of course, the above embodiments have been provided as examples only. It will be appreciated by those of ordinary skill in the art that various modifications, alternate configurations, and/or equivalents will be employed without departing from the spirit and scope of the invention. For example, while each of the embodiments utilizing polarization beam combiners provides a configuration/coating design where each polarization beam splitter reflects the same polarization state, other configurations/coating designs are also envisioned. In particular, according to an embodiment similar to that shown in FIG. 5, the position of the NIR light source 511 and the photodetector 570 are switched. In this embodiment, if the NIR light source 511 emits S-polarized light, then the polarization beam splitting cube 531 would transmit S-polarization at 780 nm in the first pass and reflect P-polarization at all three wavelengths in the second pass. Alternatively, if the NIR light source 511 was rotated to emit P-polarized light, then the polarization beam splitting cube 531 would need to transmit P-polarization at 780 nm in the first pass and reflect S-polarization at 780 nm in the second pass, as well as reflecting two other different wavelengths in the second pass (e.g., by dichroism). As discussed above, the performance of the AQWP coating is dependent on the incident light including linearly polarized light having its electric field vector at an oblique angle (e.g., ±45 degrees) to the tilt plane of the mirror. Optionally, the OPU is configured such that different wavelengths are incident at different oblique angles (e.g., one wavelength at +45 degrees while another wavelength is at −45 degrees). In addition, other source/detector layouts, such as those illustrated in FIG. 2, are also envisioned. Accordingly, the scope of the invention is therefore intended to be limited solely by the scope of the appended claims.

The invention claimed is:

1. An optical pick-up apparatus comprising:
    a plurality of light sources including a first light source for emitting light at a first wavelength and a second light source for emitting light at a second other wavelength;
    at least one beam combiner for transmitting the light emitted from each light source in the plurality of light sources along a common optical path in a first direction parallel to a first axis;
    a reflector for redirecting the light transmitted in the first direction in a second direction, the second direction parallel to a second axis substantially perpendicular to the first axis, the reflector including a coating for providing substantially quarter-wave retardation at the first and second wavelengths at a predetermined angle of incidence;
    an objective lens for focusing the light redirected by the reflector onto an optical disc; and
    at least one photo-detector for detecting light reflected from the optical disc,
    wherein the at least one beam combiner and the reflector are disposed along the first axis,
    wherein the light transmitted in the first direction from the at least one beam combiner includes linearly polarized light having its electric field vector substantially perpendicular to the first axis and at an oblique angle to the second axis, and
    wherein the coating includes a first plurality of alternating layers of isotropic materials having contrasting refractive indices, a thickness and refractive index of each layer in the first plurality selected such that the coating functions as a C-plate at the first and second wavelengths.

2. An optical pick-up apparatus according to claim 1, wherein the plurality of light sources includes a third light source for emitting a third beam of light at a third wavelength, each of the first, second, and third wavelengths being different.

3. An optical pick-up apparatus according to claim 2, wherein the at least one beam combiner includes a first beam combiner for receiving the light emitted from the first light source, a second beam combiner for receiving the light emitted from the second light source, and a third beam combiner for receiving the light emitted from the third light source, each of the first, second, and third beam combiners disposed along the first axis.

4. An optical pick-up apparatus according to claim 3, wherein the first, second, and third beam combiners are wavelength dependent polarization beam combiners for, in a first pass, directing light from the first, second, and third light sources towards the reflector, and in a second pass, directing light at the first, second, and third wavelengths from the reflector towards the at least one photodetector in dependence upon a substantially 90 degree phase shift provided by the reflector.

5. An optical pick-up apparatus according to claim 3,
    wherein the first beam combiner is for reflecting light at the first wavelength having a first polarization from the first light source to the second beam combiner, and for passing light at the first, second, and third wavelengths having a second orthogonal polarization from the second beam combiner to the at least one photodetector,
    wherein the second beam combiner is for reflecting light at the second wavelength having the first polarization from the second light source to the third beam combiner, for passing the light at the first wavelength having the first polarization from the first beam combiner to the third beam combiner, and for passing light at the first, second, and third wavelengths having the second orthogonal polarization from the third beam combiner to the first beam combiner, and
    wherein the third beam combiner is for reflecting light at the third wavelength having the first polarization from the third light source to the reflector, for passing the light at the first and second wavelengths having the first polarization from the second beam combiner to the reflector, and for passing light at the first, second, and third wavelengths having the second orthogonal polarization from the reflector to the second beam combiner.

6. An optical pick-up apparatus according to claim 3, wherein each of the first, second, and third beam combiners are oriented to provide the linearly polarized light having its electric field vector substantially perpendicular to the first axis and at an oblique angle to the second axis.

7. An optical pick-up apparatus according to claim 3, wherein each light source in the plurality of light sources and the at least one beam combiner are disposed in a same plane, the same plane rotated about the first axis relative to the second axis at an angle substantially equal to the oblique angle.

8. An optical pick-up apparatus according to claim 3, wherein each of the first, second, and third beam combiners includes a polarization beam splitting cube.

9. An optical pick-up apparatus according to claim 3, wherein each of the first, second, and third beam combiners includes a polarization beam splitting plate, each polarization beam splitting plate disposed at angle to the first axis substantially equal to ±45 degrees.

10. An optical pick-up apparatus according to claim 9, including a plate for reducing astigmatism, the plate disposed along the first axis with the polarization beam splitting plates such that each successive plate is tilted about an orthogonal axis.

11. An optical pick-up apparatus according to claim 2, wherein the at least one photo-detector includes a first photo-diode co-packaged with the first light source, a second photo-diode co-packaged with the second light source, and a third photo-diode co-packaged with the third light source.

12. An optical pick-up apparatus according to claim 11, wherein the at least one beam combiner includes a first dichroic beam splitting cube disposed along the first axis, the first dichroic beam splitting cube including an interface for passing light at the first wavelength and reflecting light at the second wavelength.

13. An optical pick-up apparatus according to claim 12, wherein the at least one beam combiner includes a second dichroic beam splitting cube disposed along the first axis, the second dichroic beam splitting cube including an interface for passing light at the first and second wavelengths and for reflecting light at the third wavelength.

14. An optical pick-up apparatus according to claim 11, including a polarizing hologram for diffracting light at the first, second, and third wavelengths in dependence upon a substantially 90 degree phase shift provided by the reflector, the polarizing hologram selected for directing the diffracted light at the first wavelength towards the first photo-diode, the diffracted light at the second wavelength towards the second photo-diode, and the diffracted light at the third wavelength towards the third photo-diode.

15. An optical pick-up apparatus according to claim 11, wherein each of the light sources in the plurality of light sources and the at least one beam combiner are disposed in a plane substantially perpendicular to the second axis.

16. An optical pick-up apparatus according to claim 11, wherein each of the light sources in the plurality of light sources are rotated such that the linearly polarized light transmitted in the first direction by the at least one beam combiner has its electric field vector substantially perpendicular to the first axis and at an oblique angle to the second axis.

17. An optical pick-up apparatus according to claim 1, comprising at least one tilted edge filter for protecting the first and second light sources from light reflected from the at least one beam combiner.

18. An optical pick-up apparatus according to claim 1, wherein the oblique angle is substantially equal to 45 degrees.

19. An optical pick-up apparatus according to claim 1, wherein the predetermined angle is substantially equal to 45 degrees.

20. An optical pick-up apparatus according to claim 1, wherein the coating is designed to allow a portion of the light transmitted in the first direction and incident on the reflector to be tapped.

21. An optical pick-up apparatus according to claim 1, wherein the coating includes a second plurality of alternating layers of isotropic materials having contrasting refractive indices, a thickness and refractive index of each layer in the second plurality selected such the coating functions as a high reflector at the first and second wavelengths.

22. An optical pick-up apparatus according to claim 21, wherein the first and second plurality of alternating layers are selected such that the C-plate functionality and the high reflector functionality is integrated.

* * * * *